(12) United States Patent
Wei et al.

(10) Patent No.: US 11,340,427 B2
(45) Date of Patent: May 24, 2022

(54) OPTICAL LENS SYSTEM AND VEHICLE CAMERA

(71) Applicant: JIANGXI LIANCHUANG ELECTRONIC CO., LTD., Nanchang (CN)

(72) Inventors: Wenzhe Wei, Nanchang (CN); Yumin Bao, Nanchang (CN); Weijian Chen, Nanchang (CN); Xuming Liu, Nanchang (CN); Jiyong Zeng, Nanchang (CN); Kemin Wang, Nanchang (CN)

(73) Assignee: JIANGXI LIANCHUANG ELECTRONIC CO., LTD., Nanchang (CN)

(*) Notice: Subject to any disclaimer, the term of this patent is extended or adjusted under 35 U.S.C. 154(b) by 387 days.

(21) Appl. No.: 16/744,155

(22) Filed: Jan. 15, 2020

(65) Prior Publication Data

US 2020/0150386 A1 May 14, 2020

Related U.S. Application Data

(63) Continuation of application No. PCT/CN2019/085184, filed on Apr. 30, 2019.

(30) Foreign Application Priority Data

Jun. 14, 2018 (CN) .......................... 201810614191.9

(51) Int. Cl.
*G02B 9/64* (2006.01)
*H04N 5/225* (2006.01)
*G02B 13/00* (2006.01)

(52) U.S. Cl.
CPC ............. *G02B 9/64* (2013.01); *H04N 5/2257* (2013.01); *G02B 13/006* (2013.01)

(58) Field of Classification Search
CPC ........ G02B 9/62; G02B 9/64; G02B 13/0045; G02B 13/006; H04N 5/2257
See application file for complete search history.

(56) References Cited

U.S. PATENT DOCUMENTS

| 5,864,435 A | 1/1999 | Toyama |
| 2014/0153116 A1 | 6/2014 | Kubota et al. |
| 2016/0109687 A1 | 4/2016 | Ju |

FOREIGN PATENT DOCUMENTS

| CN | 105425363 A | 3/2016 |
| CN | 105700114 A | 6/2016 |

(Continued)

OTHER PUBLICATIONS

International Search Report issued in corresponding International application No. PCT/CN2019/085184, dated Jul. 29, 2019 (8 pages).

(Continued)

*Primary Examiner* — Jack Dinh

(57) ABSTRACT

The disclosure provides an optical lens system and a vehicle camera. From an object side to an imaging surface, the optical lens system sequentially includes a first lens having a negative refractive power; a second lens having a positive refractive power; a third lens having a positive refractive power; a fourth lens having a positive refractive power; a fifth lens having a negative refractive power, the fourth lens and the fifth lens constituting a cemented lens; a sixth lens having a positive refractive power; a seventh lens with a negative refractive power; a stop disposed between the first lens and the third lens. The lens of the present disclosure not only has thermal stability, but also has extremely high resolution for the objects that emit or reflect monochromatic lights of different wavelengths, so as to meet the requirements of the driverless vehicle system on the lens.

20 Claims, 12 Drawing Sheets

(56) References Cited

FOREIGN PATENT DOCUMENTS

| CN | 105988193 A | 10/2016 |
| CN | 106154488 A | 11/2016 |
| CN | 106483627 A | 3/2017 |
| CN | 107490841 A | 12/2017 |
| CN | 108919459 A | 11/2018 |

OTHER PUBLICATIONS

Written Opinion of the International Searching Authority for No. PCT/CN2019/085184, dated Jul. 29, 2019 (5 pages).
Notification of grant a patent issued in corresponding Chinese application No. 201810614191.9, dated Aug. 8, 2019 (2 page).
EPO, Office Action for EP Application No. 19819966.3, dated Jun. 8, 2021.

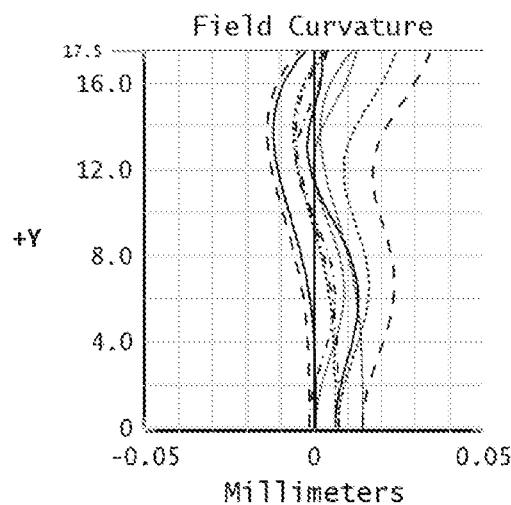
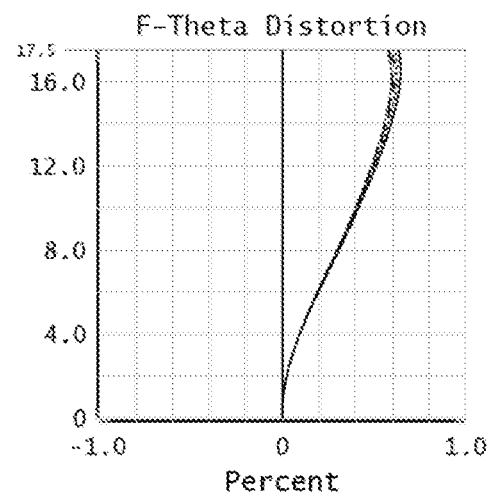
FIG. 2b     FIG. 2c
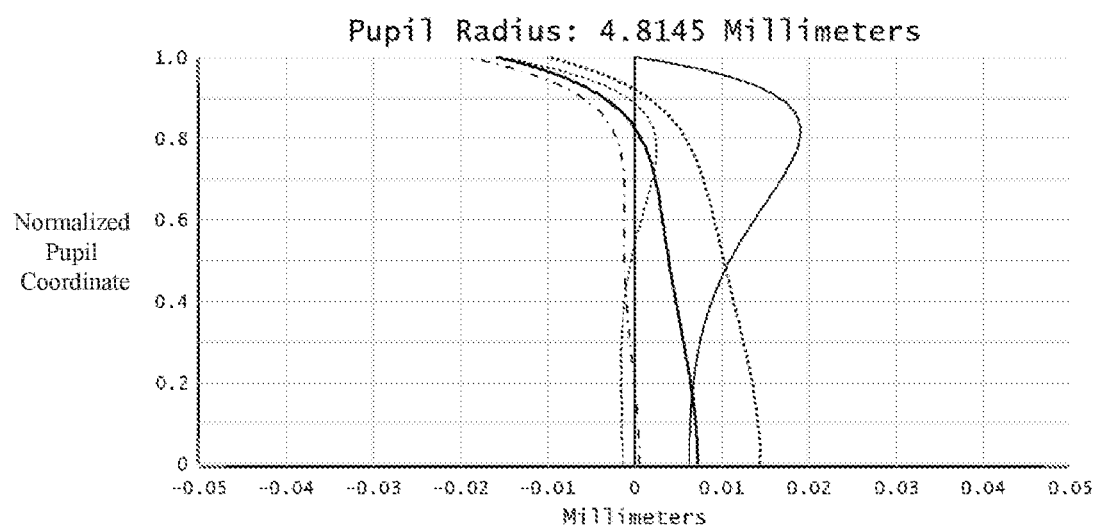
FIG. 2d

OPTICAL LENS SYSTEM AND VEHICLE CAMERA

CROSS REFERENCE TO RELATED APPLICATION(S)

This application is a continuation of International Application No. PCT/CN2019/085184, filed on Apr. 30, 2019, titled "OPTICAL LENS SYSTEM". The international Application No. PCT/CN2019/085184 claims priority to a Chinese application No. 201810614191.9 filed on Jun. 14, 2018, titled "OPTICAL LENS SYSTEM". The entirety of the above-mentioned applications is hereby incorporated by reference herein.

TECHNICAL FIELD

The present disclosure relates to the field of optical lens technologies, and more particularly, to an optical lens system and a vehicle camera.

BACKGROUND

In recent years, with the promotion of the concept of driverless driving and the continuous maturity of the driverless driving technology, driverless driving may become a trend in the development of automobiles. The key of the driverless driving technology is how to obtain sufficiently accurate road information, so it imposes special requirements for every component of driverless cars.

A vehicle lens is a key component of the driverless car. It acts as the eyes of the driverless car, and its performance directly affects the safety coefficient of the driverless car. The requirements imposed on the lens by the driverless technology include a small lens front diameter, a strong light transmission ability which is capable of adapting to brightness/darkness changes in the external environment, a high imaging clarity which can effectively distinguish details of the road environment, a good thermal stability which enables the lens has good resolution in high and low temperature environments, and a good resolution for the objects that emit or reflect monochromatic lights of different wavelengths such as signal indicators, highway signs, etc, so as to meet the requirements of a driverless vehicle system.

However, in the prior art, none of the current optical lenses on the market can meet the above requirements. Therefore, it is imperative to develop a high-performance optical lens that can be cooperated with the driverless vehicle system.

SUMMARY

Based on the above, the present disclosure aims to provide an optical lens system to meet the requirements imposed on the lens by the driverless driving.

An optical lens system, from an object side to an imaging surface thereof, the optical lens system sequentially includes:
a first lens having a negative refractive power and a concave surface facing the object side;
a second lens having a positive refractive power, whose object side surface and image side surface both are convex surfaces;
a third lens having a positive refractive power and a convex surface facing the object side; a fourth lens having a positive refractive power, whose object side surface and image side surface both are convex surfaces;
a fifth lens having a negative refractive power, whose object side surface and image side surface both are concave surfaces, the fourth lens and the fifth lens constituting a cemented lens;
a sixth lens having a positive refractive power, a convex surface facing the object side and a concave surface facing the imaging surface;
a seventh lens having a negative refractive power and a concave surface facing the imaging surface;
wherein the optical lens system further comprises a stop disposed between the first lens and the third lens, the first lens, the fourth lens and the fifth lens are glass spherical lenses, and the seventh lens is a glass aspheric lens.

Compared with the related art, the optical lens system in the present disclosure provides the first lens to the seventh lens, wherein the first lens is configured for light collection and distortion correction, the second lens, the third lens, the fourth lens and the sixth lens are configured for converging the lights, the third lens and the fourth lens also can eliminate heat difference and secondary spectrum, the fifth lens and the fourth lens also can act as a negative lens and a positive lens to eliminate chromatic aberration, the seventh lens can eliminate aberrations and control the exit angle of the chief ray. Therefore, the optical lens system has strong light passing ability, can adapt to the changes in brightness/darkness of the external environment, and also has a relatively high imaging clarity. In addition, by setting the lenses of the optical lens system as glass lenses, the lens system can have better thermal stability performance. By properly distributing the refractive power and selecting specific glass, the lens of the present disclosure has good effect on monochromatic lights of each wavelength in a wide visible light range and improves the resolution of the lens for the objects that emit or reflect monochromatic lights of different wavelengths such as signal indicators, highway signs, etc, so as to meet the requirements of the driverless vehicle system on the lens as much as possible.

In addition, the optical lens system in the embodiment of the present disclosure also has the following technical features:

Further, the third lens and the fourth lens satisfy the following expression:

$$(dn/dt)_3+(dn/dt)_4<-2\times10^{-6}/°C.;$$

where $(dn/dt)_3$ represents a temperature coefficient of refractive index of the third lens, $(dn/dt)_4$ represents temperature coefficient of refractive index of the fourth lens.

Further, the third lens and the fourth lens satisfy the following expressions:

$$Vd_3+Vd_4>150;$$

$$\Delta Pg,F3+\Delta Pg,F4>0.005;$$

where $Vd_3$ represents the abbe number of the third lens, $Vd_4$ represents the abbe number of the fourth lens, $\Delta Pg,F3$ represents a deviation of relative partial dispersion from the abbe empirical formula of the third lens. $\Delta Pg,F4$ represents a deviation of relative partial dispersion from the abbe empirical formula of the fourth lens.

Further, the optical lens system satisfies the following expressions:

$$0.5<|f_{52}|-t_{52}<13;$$

$$0.1<|f_{61}|-t_{61}<10:$$

where $f_{52}$ represents a focal length of an image side surface of the fifth lens, $f_{61}$ represents a focal length of an object side surface of the sixth lens, $t_{52}$ represents a distance from a vertex of an image side surface of the fifth lens to the imaging surface of the optical lens system, $t_{61}$ is a distance from a vertex of an object side surface of the sixth lens to the imaging surface of the optical lens system.

Further, the optical lens system satisfies the following expression:

$$0.2 < IH/\theta < 0.3;$$

where θ represents half field angle of the optical lens system, and IH represents an image height when the half field angle is θ.

Further, the third lens and the fourth lens satisfy the following expression:

$$40 < \varphi_3 + \varphi_4 < 75;$$

where $\varphi_3$ represents a refractive power of the third lens, $\varphi_4$ represents a refractive power of the fourth lens.

Further, the optical lens system satisfies the following expression:

$$0.5 < f_1/r_1 < 3;$$

where $f_1$ represents a focal length of the first lens, $r_1$ represents a radius of curvature of an object side surface of the first lens.

Further, the optical lens system satisfies the following expression:

$$5 < CT_2 + CT_3 < 13;$$

where $CT_2$ represents a center thickness of the second lens, and $CT_3$ represents a center thickness of the third lens.

Further, the optical lens system satisfies the following expression:

$$1 < f_3/r_5 < 4;$$

where $f_3$ represents a focal length of the third lens, $r_5$ represents a radius of curvature of an object side surface of the third lens.

Further, the optical lens system satisfies the following expression:

$$-13 < f_7/r_{13} < 0;$$

where $f_7$ represents a focal length of the seventh lens, and $r_{13}$ represents a radius of the curvature of an image side surface of the seventh lens.

Satisfying the above configuration is beneficial to ensure that the optical lens system has high pixels, good thermal stability, and excellent wide-spectrum imaging performance. In addition, f-θ distortion is controlled to increase the magnification of the field of view of the lens, thereby improving the resolution of the edge of the lens, so that it has sufficient resolution after the image of the field of view is flattened and expanded.

BRIEF DESCRIPTION OF THE DRAWINGS

FIG. 2b is a field curvature diagram of the optical lens system according to the second embodiment of the present disclosure.

FIG. 2c is a distortion diagram of the optical lens system according to the second embodiment of the present disclosure.

FIG. 2d is an axial chromatic aberration diagram of the optical lens system according to the second embodiment of the present disclosure.

REFERENCE NUMERALS OF MAIN COMPONENTS

Figure 1A:
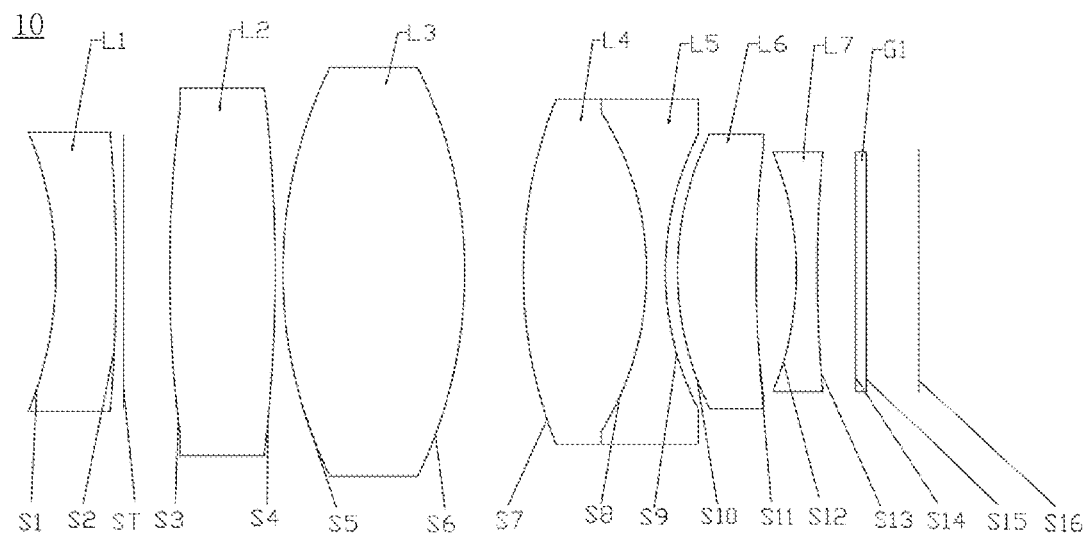
FIG. 1a is a schematic cross-sectional view of the optical lens system according to a first embodiment of the present disclosure.

| first lens | L1 | second lens | L2 |
| third lens | L3 | fourth lens | L4 |
| fifth lens | L5 | sixth lens | L6 |
| seventh lens | L7 | filter | G1 |
| stop | ST | | |

The following embodiments will further illustrate the present disclosure with reference to the above drawings.

DETAILED DESCRIPTION OF PREFERRED EMBODIMENTS

In order to facilitate the understanding of the present disclosure, the present disclosure will be described more fully hereinafter with reference to the accompanying drawings. Several embodiments of the disclosure are presented in the drawings. However, the disclosure may be embodied in many different forms and is not limited to the embodiments described herein. Rather, these embodiments are provided so that this disclosure will be thorough and comprehensive.

Unless defined otherwise, all technical and scientific terms used herein have the same meaning as commonly understood by one of ordinary skill in the art to which this invention belongs. The terminology used herein in the description of the present invention is only for the purpose of describing specific embodiments, and is not intended to limit the present disclosure. The term "and/or" as used herein includes any and all combinations of one or more of the associated listed items.

Embodiment 1

Please refer to FIG. 1a, which is a structural diagram of an optical lens system 10 in a first embodiment of the present disclosure. From an object side to an imaging surface, the optical lens system 10 sequentially includes: a first lens L1 with a negative refractive power, a stop ST, a second lens L2 with a positive refractive power, a third lens L3 with a positive refractive power, a fourth lens L4 with a positive refractive power, a fifth lens L5 with a negative refractive power, a sixth lens L6 with a positive refractive power, a seventh lens L7 with a negative refractive power, and a filter G1. An object side surface S1 of the first lens L1 is a concave surface, the stop ST is positioned between an image side surface S2 of the first lens L1 and an object side surface S3 of the second lens L2. The object side surface S3 and an image side surface S4 of the second lens L2 both are convex surfaces. The third lens L3 includes an object side surface S5 and an image side surface S6, both are convex surfaces. The fourth lens S4 has an object side surface S7 which is convex, and the fifth lens L5 has an image side surface S9 which is concave. An object side surface S10 of the sixth lens L6 is convex, meanwhile an image side surface S11 of the sixth lens L6 is concave. Both of an object side surface S12 and an image side surface S13 of the seventh lens L7 are concave surfaces.

An image side surface of the fourth lens L4 is matched with and bonded to an object side surface of the fifth lens L5, in other words, the fifth lens L5 and the fourth lens L4 are bonded together to form a cemented lens, which is also called as an achromatic doublet lens.

The filter G1 includes an object side surface S14 and an image side surface S15, both of which are flat.

The first lens L1, the third lens L3, the fourth lens L4, the fifth lens L5 and the sixth lens L6 are glass spherical lenses, the second lens L2 and the seventh lens L7 are glass aspheric lenses.

The shapes of the aspherical surfaces of the optical lens system 10 satisfy the following equation:

$$z = \frac{ch^2}{1 + \sqrt{1-(1+K)c^2h^2}} + Bh^4 + Ch^6 + Dh^8 + Eh^{10} + Fh^{12},$$

Where z represents a vector height between a position on the surface and a vertex of the surface along an optical axis of the lens, c represents a curvature of the vertex of the surface, K is a quadratic surface coefficient, h is a distance between the position on the surface and the optical axis, B is a fourth order surface coefficient, C is a sixth order surface coefficient, D is an eighth order surface coefficient, E is a tenth order surface coefficient. F is a twelfth order surface coefficient.

It should be noted that the above-mentioned aspheric shape equation is not only applicable to the aspheric lenses of this embodiment, but also applicable to the aspheric lenses in the following embodiments of the present disclosure.

Further, the third lens L3 and the fourth lens L4 satisfy the following expression:

$$(dn/dt)_3 + (dn/dt)_4 < -2 \times 10^{-4}/° C.;$$

where $(dn/dt)_3$ represents a temperature coefficient of refractive index of the third lens L3, $(dn/dt)_4$ represents a temperature coefficient of refractive index of the fourth lens L4.

It can be understood that, since the temperature coefficients of refractive index of the third lens L3 and the fourth lens L4 in the optical lens system 10 of the present disclosure are both negative values, the focal length of the optical lens system 10 can be increased at high temperature and decreased at low temperature, thereby effectively compensating the thermal expansion of the lens components, such as a lens barrel, a lens holder, and ensuring the optical lens system 10 has a good resolution at high and low temperatures.

Further, the third lens L3 and the fourth lens L4 satisfy the following expressions:

$$Vd_3+Vd_4>150;$$

$$\Delta Pg,F3+\Delta Pg,F4>0.005;$$

where $Vd_3$ represents the abbe number of the third lens L3, $Vd_4$ represents the abbe number of the fourth lens L4, $\Delta Pg,F3$ represents a deviation of relative partial dispersion from the abbe empirical formula of the third lens L3, $\Delta Pg,F4$ represents a deviation of relative partial dispersion from the abbe empirical formula of the fourth lens LA.

It can be understood that, the low dispersion and high relative partial dispersion of the third lens L3 and the fourth lens L4 of the optical lens system 10 in the present disclosure can effectively correct the secondary spectrum, reduce the difference in focus distance between different wavelengths of lights, and effectively improve the MTF value of different monochromatic lights in the visible light range, so that the lenses of the present disclosure have good effect on monochromatic lights of respective wavelength in the wide visible light range. It is beneficial to improve the resolution of the optical lens system 10 for objects that emit or reflect monochromatic lights of different wavelengths such as signal lights, highway signs, etc.

Further, the optical lens system 10 satisfies the following expressions:

$$0.5<||f_{52}|-t_{52}|<13;$$

$$0.1<||f_{61}|-t_{61}|<10;$$

where $f_{52}$ represents a focal length of an image side surface of the fifth lens L5, $f_{61}$ represents a focal length of an object side surface of the sixth lens L6, $t_{52}$ represents a distance from a vertex of an image side surface of the fifth lens L5 to the imaging surface of the optical lens system 10, $t_{61}$ represents a distance from a vertex of an object side surface of the sixth lens L6 to the imaging surface of the optical lens system 10. Satisfying this condition can effectively eliminate the ghosting generated by the lenses, and avoid the ghosting of the lenses to interfere with the machine or human eyes recognition.

Further, the optical lens system 10 satisfies the following expression:

$$0.2<IH/\theta<0.3:$$

where $\theta$ represents half field angle of the optical lens system 10, and IH represents an image height when the half field angle is $\theta$. Satisfying this condition, the f-θ distortion of the optical lens system 10 can be well controlled, and the imaging deformation caused by the f-θ distortion can be effectively reduced.

Further, the third lens L3 and the fourth lens L4 satisfies the following expression:

$$40<\varphi_3+\varphi_4<75;$$

where $\varphi_3$ represents a refractive power of the third lens L3, $\varphi_4$ represents a refractive power of the fourth lens L4.

Further, the third lens L3 and the fourth lens IA satisfies the following expression:

$$0.5<f_1/r_1<3;$$

where $f_1$ represents a focal length of the first lens L1, $r_1$ represents a radius of curvature of an object side surface of the first lens L1. When the value of $f_1/r_1$ exceeds an upper limit, it is not conducive to reduce the diameter of the lens; and when the value of $f_1/r_1$ exceeds a lower limit, it does not facilitate to process the lens.

Further, the optical lens system 10 satisfies the following expression:

$$5<CT_2+CT_3<13;$$

where $CT_2$ represents a center thickness of the second lens L2, and $CT_3$ represents a center thickness of the third lens L3. Satisfying this condition, it may be ensured that the optical lens system 10 can effectively reduce the field curvature and reduce the shift of the focus for lights in different fields of views.

Further, the optical lens system 10 satisfies the following expression:

$$1<f_3/r_5<4;$$

where $f_3$ represents a focal length of the third lens L3, $r_5$ represents a radius of curvature of an object side surface of the third lens L3. Satisfying this condition can ensure that the third lens L3 can converge the lights well, facilitate to reduce the rear lens diameter, thereby reducing the size of the lens.

Further, the optical lens system 10 satisfies the following expression:

$$-13<f_7/r_{13}<0,$$

where $f_7$ represents a focal length of the seventh lens L7, and $r_{13}$ represents a radius of the curvature of an image side surface of the seventh lens L7. Satisfying this condition can ensure that the optical lens system 10 can correct aberrations well, and can effectively control the exit angle of the lights. Beyond the range of this expression, it will increase the difficulty of lens processing and aberration correction.

In summary, the optical lens system 10 in the present disclosure provides the first lens L1 to the seventh lens L7, wherein the first lens L1 is configured for light collection and distortion correction, the second lens L2, the third lens L3, the fourth lens L4 and the sixth lens L6 are configured for converging the lights, the third lens L3 and the fourth lens L4 also can eliminate heat difference and secondary spectrum, the fifth lens L5 and the fourth lens L4 also can act as a negative lens and a positive lens to eliminate chromatic aberration, the difference between the abbe number Vd of the fourth lens L4 and the fifth lens L5 is greater than 30, the seventh lens L7 can eliminate aberrations and control the exit angle of the chief ray. Therefore, the optical lens system 10 has strong light passing ability; can adapt to the changes in brightness/darkness of the external environment, and also has a relatively high imaging clarity. In addition, by setting the lenses of the optical lens system 10 as glass lenses, the lens system can have better thermal stability performance. By properly distributing the refractive power, and enabling the third lens L3 and the fourth lens L4 to use materials with negative temperature index, low dispersion and high relative partial dispersion, the focus shift of the optical lens system 10 caused by changes in ambient temperature can be minimized, the problem of thermal drift can be solved, the secondary spectrum also can be corrected well, so that the focal positions of monochromatic lights of different wavelengths are closer. The lens of the present disclosure not only has reliable thermal stability, but also has good effect on monochromatic lights of each wavelength in a wide visible light range. It is beneficial to improve the resolution of the lens for the objects that emit or reflect monochromatic lights of different wavelengths such as signal indicators, highway signs, etc, so as to meet the requirements of the driverless vehicle system on the lens as much as possible.

Related parameters of each lens in the optical lens system 10 are shown in Table 1-1.

TABLE 1-1

| Surface NO. | Surface type | | Radius of curvature | Thickness | Refractive index | Abbe number |
|---|---|---|---|---|---|---|
| Object surface | Subject | Spherical surface | Infinity | Infinity | | |
| S1 | First lens | Spherical surface | −14.494478 | 2.371605 | 1.613 | 37.01 |
| S2 | | Spherical surface | −63.149885 | 0.261495 | | |
| ST | Stop | Spherical surface | Infinity | 1.802385 | | |
| S3 | Second lens | Aspheric surface | 34.746436 | 4.103308 | 1.693 | 53.20 |
| S4 | | Aspheric surface | −74.219015 | 0.285721 | | |
| S5 | Third lens | Spherical surface | 18.289763 | 7.072520 | 1.497 | 81.59 |
| S6 | | Spherical surface | −18.289763 | 2.277053 | | |
| S7 | Fourth lens | Spherical surface | 18.581112 | 4.773657 | 1.593 | 67.33 |
| S8 | Fifth lens | Spherical surface | −11.880198 | 0.751239 | 1.689 | 31.16 |
| S9 | | Spherical surface | 11.880198 | 0.452731 | | |
| S10 | Sixth lens | Spherical surface | 12.035616 | 3.044081 | 1.911 | 35.26 |
| S11 | | Spherical surface | 40.715315 | 1.599017 | | |
| S12 | Seventh lens | Aspheric surface | −13.192815 | 0.802963 | 1.693 | 53.20 |
| S13 | | Aspheric surface | 50.505483 | 1.500000 | | |
| S14 | Filter | Spherical surface | Infinity | 0.400000 | 1.517 | 64.20 |
| S15 | | Spherical surface | Infinity | 2.027862 | | |
| S16 | The imaging surface | Spherical surface | Infinity | — | | |

The parameters of the aspheric surfaces of the second lens L2 and the seventh lens L7 of this embodiment are shown in Table 1-2.

TABLE 1-2

| Surface NO. | K | B | C | D | E | F |
|---|---|---|---|---|---|---|
| S3 | −1.670138 | −8.022639E−05 | −4.302874E−07 | −1.085510E−08 | 7.123604E−11 | 0.000000E+00 |
| S4 | −8.862262 | −2.201658E−05 | −1.618435E−07 | −8.234636E−09 | 9.767447E−11 | 0.000000E−00 |
| S12 | −5.956645 | −8.492779E−04 | 5.495009E−05 | −3.232166E−06 | 1.033001E−07 | −1.285605E−09 |
| S13 | −16.121277 | −3.339555E−04 | 3.810517E−05 | −1.821911E−06 | 3.618848E−08 | −6.152127E−11 |

Figure 1B:
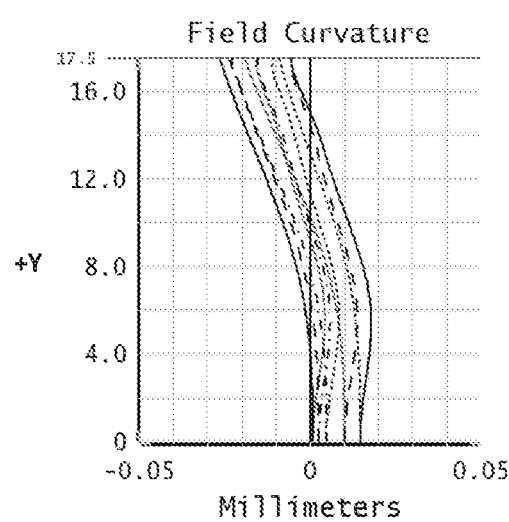
FIG. 1b is a field curvature diagram of the optical lens system according to the first embodiment of the present disclosure.
Figure 1C:
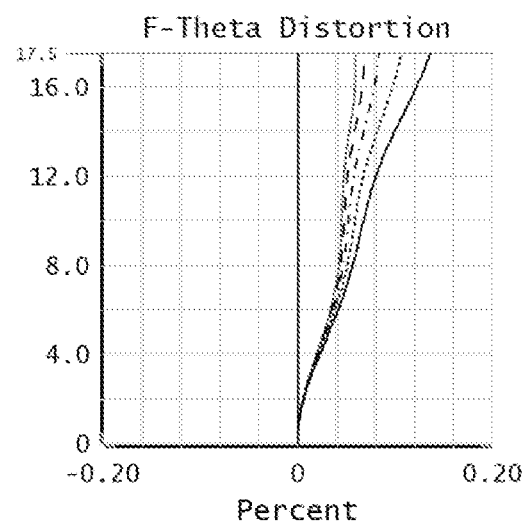
FIG. 1c is a distortion diagram of the optical lens system according to the first embodiment of the present disclosure.
Figure 1D:
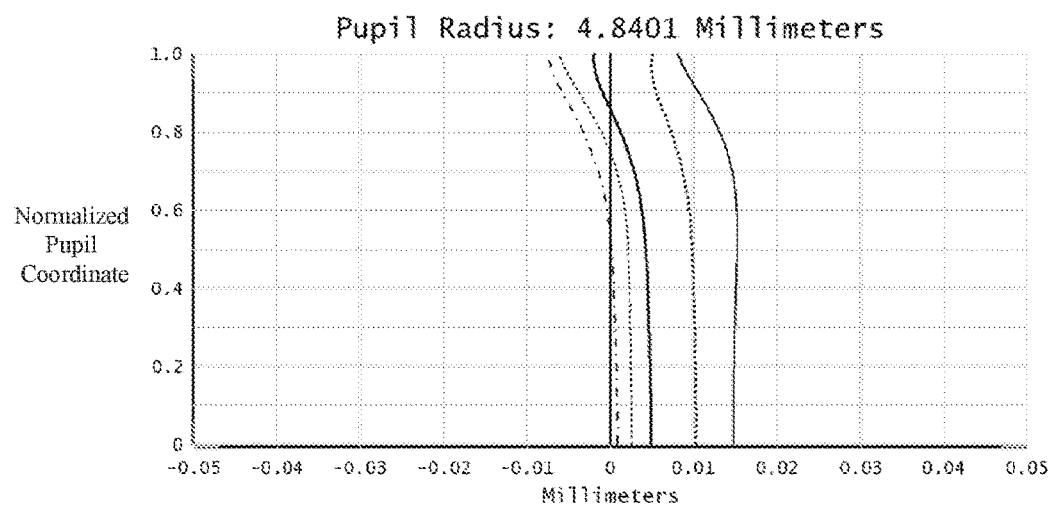
FIG. 1d is an axial chromatic aberration diagram of the optical lens system according to the first embodiment of the present disclosure.

FIG. 1b, FIG. 1c, and FIG. 1d illustrate the field curvature diagram, distortion diagram and axial chromatic aberration diagram of the optical lens system 10 in this embodiment, respectively. As can be seen from FIG. 1b to FIG. 1d, the field curvature, the distortion and the chromatic aberration can be well corrected in this embodiment.

Embodiment 2

Figure 2A:
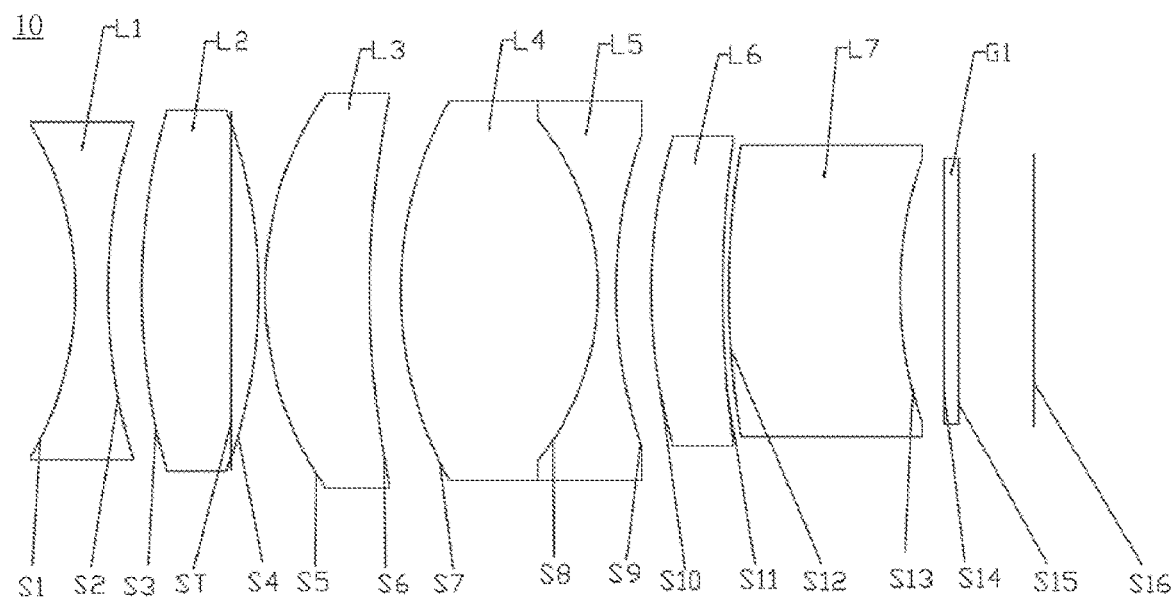
FIG. 2a is a schematic cross-sectional view of the optical lens system according to a second embodiment of the present disclosure.

Please refer to FIG. 2a, FIG. 2a is a structural diagram of an optical lens system 10 according to the second embodiment of the present disclosure. The lens structure provided in this embodiment is different from the lens structure in the first embodiment is that: (1) an object side surface and an image side surface of the first lens L1 both are concave surfaces, and an object side surface of the third lens L3 is a convex surface and an image side surface of the third lens L3 is a concave surface, and an object side surface of the seventh lens L7 is a convex surface and an image side surface of the seventh lens L7 is a concave surface; (2) the stop ST is disposed between the second lens L2 and the third lens L3; (3) the second lens L2 is a glass spherical lens; (4) the related parameters of other lenses are different. Related parameters of each lens are shown in Table 2-1.

TABLE 2-1

| Surface NO. | Surface type | | Radius of curvature | Thickness | Refractive index | Abbe number |
|---|---|---|---|---|---|---|
| Object surface | Subject | Spherical surface | Infinity | Infinity | | |
| S1 | First lens | Spherical surface | −11.592661 | 1.163199 | 1.613 | 37.01 |
| S2 | | Spherical surface | 19.751587 | 1.136888 | | |
| S3 | Second lens | Spherical surface | 22.924887 | 4.092293 | 1.723 | 38.02 |
| S4 | | Spherical surface | −17.734275 | −0.968123 | | |
| ST | Stop | Spherical surface | Infinity | 1.166996 | | |
| S5 | Third lens | Spherical surface | 12.082978 | 3.674930 | 1.437 | 95.10 |
| S6 | | Spherical surface | 33.642106 | 1.095780 | | |
| S7 | Fourth lens | Spherical surface | 14.100363 | 6.880603 | 1.593 | 67.33 |
| S8 | Fifth lens | Spherical surface | −9.400656 | 0.612328 | 1.689 | 31.16 |
| S9 | | Spherical surface | 16.477184 | 1.220307 | | |
| S10 | Sixth lens | Spherical surface | 19.128073 | 2.473526 | 1.911 | 35.26 |

TABLE 2-1-continued

| Surface NO. | Surface type | Radius of curvature | Thickness | Refractive index | Abbe number |
|---|---|---|---|---|---|
| S11 | Spherical surface | 35.740725 | 0.245258 | | |
| S12 | Seventh lens Aspheric surface | 16.489875 | 5.975151 | 1.621 | 63.88 |
| S13 | Aspheric surface | 12.098150 | 1.500000 | | |
| S14 | Filter Spherical surface | Infinity | 0.400000 | 1.517 | 64.20 |
| S15 | Spherical surface | Infinity | 2.240201 | | |
| S16 | The imaging surface Spherical surface | Infinity | — | | |

The parameters of the aspheric surfaces of the seventh lens L7 of this embodiment are shown in Table 2-2.

TABLE 2-2

| Surface NO. | K | B | C | D | E | F |
|---|---|---|---|---|---|---|
| S12 | 3.360248 | −4.826164E−04 | −8.875078E−06 | 2.124485E−07 | −1.378097E−08 | 2.382802E−10 |
| S13 | 0.960708 | −6.283509E−05 | −3.352469E−05 | 2.144107E−06 | −9.533962E−08 | 1.698379E−09 |

FIG. 2b, FIG. 2c, and FIG. 2d illustrate the field curvature diagram, distortion diagram and axial chromatic aberration diagram of the optical lens system 10 in this embodiment, respectively. As can be seen from FIG. 2b to FIG. 2d, the field curvature, the distortion and the chromatic aberration can be well corrected in this embodiment.

Embodiment 3

Figure 3A:
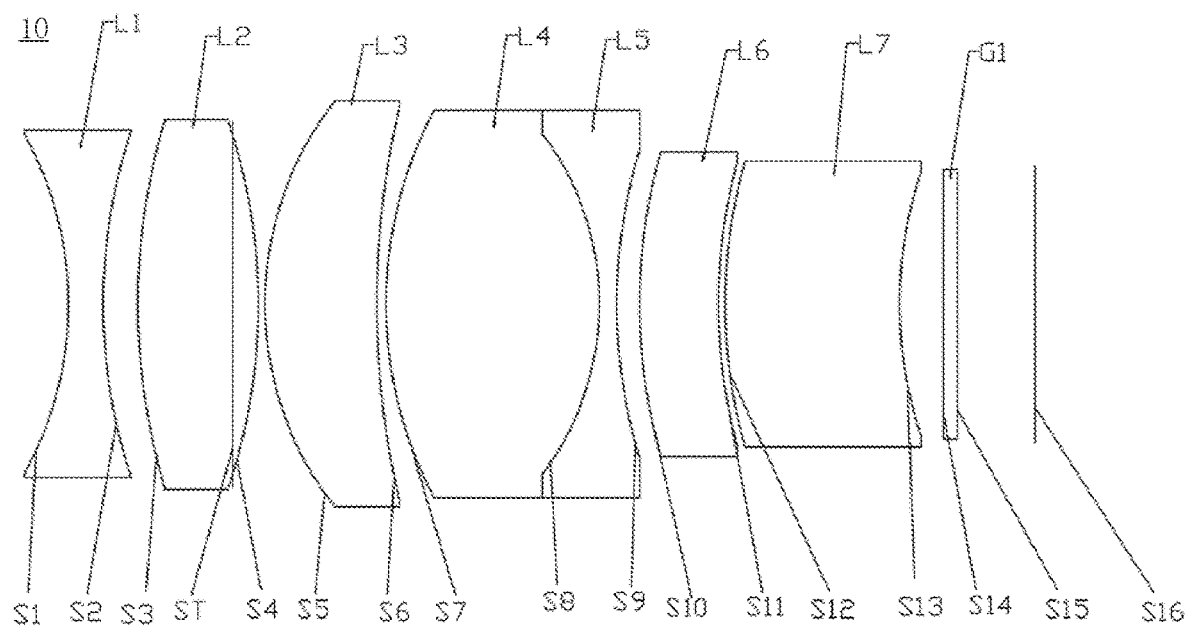
FIG. 3a is a schematic cross-sectional view of the optical lens system according to a third embodiment of the present disclosure.

Please refer to FIG. 3a, FIG. 3a is a structural diagram of an optical lens system 10 according to the third embodiment of the present disclosure. The lens structure provided in this embodiment is different from the lens structure in the first embodiment is that: (1) an object side surface and an image side surface of the first lens L1 both are concave surfaces, and an object side surface of the third lens L3 is a convex surface and an image side surface of the third lens L3 is a concave surface, and an object side surface of the seventh lens L7 is a convex surface and an image side surface of the seventh lens L7 is a concave surface; (2) the stop ST is disposed between the second lens L2 and the third lens L3; (3) the second lens L2 is a glass spherical lens and the sixth lens L6 is a glass aspherical lens; (4) the related parameters of other lenses are different. Related parameters of each lens are shown in Table 3-1.

TABLE 3-1

| Surface NO. | Surface type | Radius of curvature | Thickness | Refractive index | Abbe number |
|---|---|---|---|---|---|
| Object surface | Subject Spherical surface | Infinity | Infinity | | |
| S1 | First lens Spherical surface | −11.976029 | 1.200553 | 1.613 | 37.01 |
| S2 | Spherical surface | 18.442265 | 1.181351 | | |
| S3 | Second lens Spherical surface | 21.411583 | 4.145002 | 1.723 | 38.02 |
| S4 | Spherical surface | −19.286256 | −0.877432 | | |
| ST | Stop Spherical surface | Infinity | 1.111799 | | |
| S5 | Third lens Spherical surface | 11.252093 | 3.838694 | 1.437 | 95.10 |
| S6 | Spherical surface | 29.187333 | 0.329973 | | |
| S7 | Fourth lens Spherical surface | 14.256602 | 7.310105 | 1.593 | 67.33 |
| S8 | Fifth lens Spherical surface | −9.549359 | 0.612328 | 1.689 | 31.16 |
| S9 | Spherical surface | 18.539892 | 0.782115 | | |
| S10 | Sixth lens Aspheric surface | 18.989284 | 2.670310 | 1.808 | 40.92 |
| S11 | Aspheric surface | 39.330426 | 0.250289 | | |
| S12 | Seventh lens Aspheric surface | 19.327695 | 5.989484 | 1.621 | 63.88 |
| S13 | Aspheric surface | 12.028573 | 1.500000 | | |
| S14 | Filter Spherical surface | Infinity | 0.400000 | 1.517 | 64.20 |
| S15 | Spherical surface | Infinity | 2.224803 | | |
| S16 | The imaging surface Spherical surface | Infinity | — | | |

The parameters of the aspheric surfaces of the sixth lens L6 and the seventh lens L7 of this embodiment are shown in Table 3-2.

TABLE 3-2

| Surface NO. | K | B | C | D | E | F |
|---|---|---|---|---|---|---|
| S10 | −0.227487 | 6.354141E−06 | −5.605356E−06 | 5.589140E−07 | −1.757158E−08 | 9.634393E−11 |
| S11 | 4.159960 | 2.651268E−05 | −6.080188E−07 | 2.382211E−06 | −3.633551E−08 | −7.768134E−10 |
| S12 | 2.772528 | −5.730588E−04 | −1.564007E−06 | 2.851916E−06 | −6.777178E−08 | −1.419212E−10 |
| S13 | −0.788175 | −1.570166E−04 | −2.960847E−05 | 2.581358E−06 | −1.101504E−07 | 1.724799E−09 |

Figure 3B:
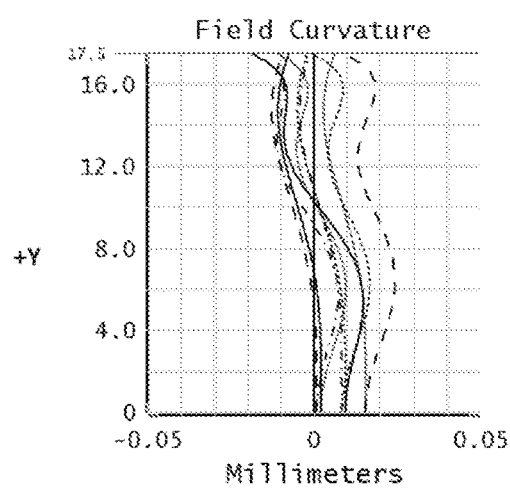
FIG. 3b is a field curvature diagram of the optical lens system according to the third embodiment of the present disclosure.
Figure 3C:
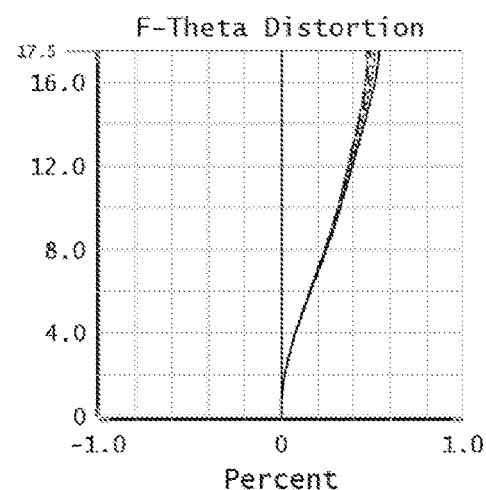
FIG. 3c is a distortion diagram of the optical lens system according to the third embodiment of the present disclosure.
Figure 3D:
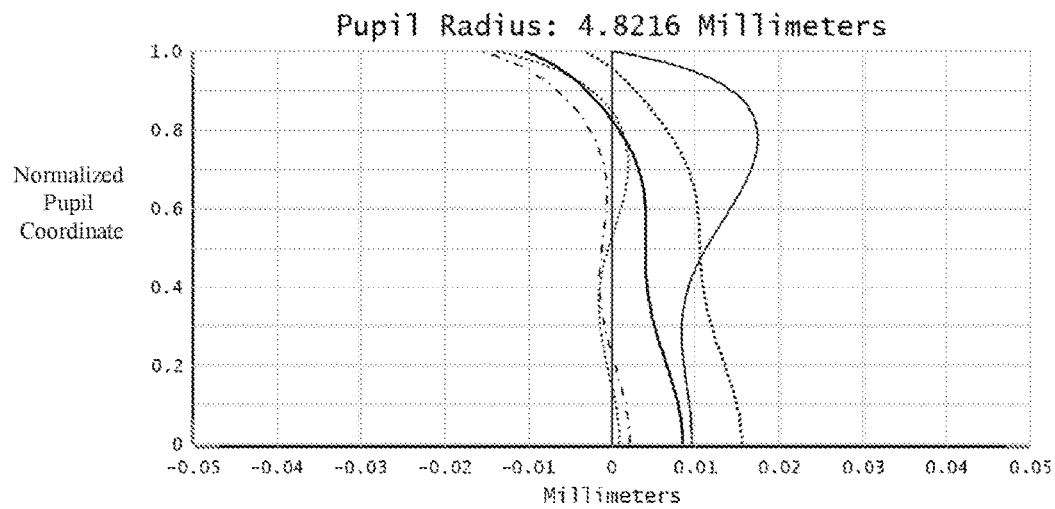
FIG. 3d is an axial chromatic aberration diagram of the optical lens system according to the third embodiment of the present disclosure.

FIG. 3b, FIG. 3c, and FIG. 3d illustrate the field curvature diagram, distortion diagram and axial chromatic aberration diagram of the optical lens system 10 in this embodiment, respectively. As can be seen from FIG. 3b to FIG. 3d, the field curvature, the distortion and the chromatic aberration can be well corrected in this embodiment.

Embodiment 4

Figure 4A:
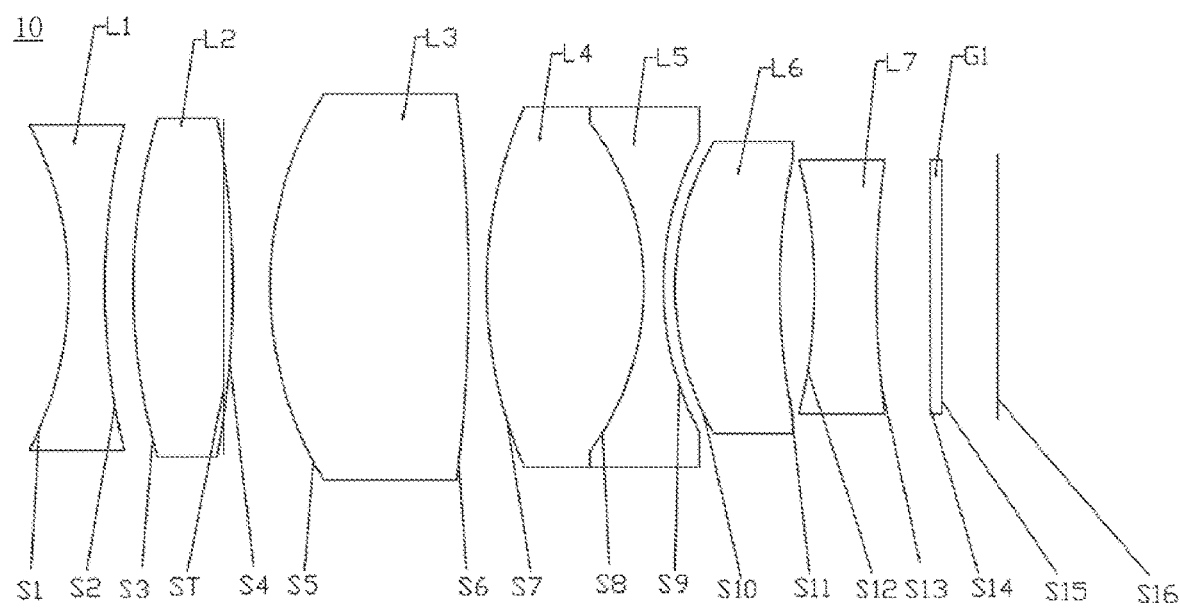
FIG. 4a is a schematic cross-sectional view of the optical lens system according to a fourth embodiment of the present disclosure.

Please refer to FIG. 4a, FIG. 4a is a structural diagram of an optical lens system 10 according to the fourth embodiment of the present disclosure. The lens structure provided in this embodiment is different from the lens structure in the first embodiment is that: (1) an object side surface and an image side surface of the first lens L1 both are concave surfaces; (2) the stop ST is disposed between the second lens L2 and the third lens L3; (3) the second lens L2 is a glass spherical lens and the third lens L3 is a glass aspherical lens; (4) the related parameters of other lenses are different. Related parameters of each lens are shown in Table 4-1.

TABLE 4-1

| Surface NO. | | Surface type | Radius of curvature | Thickness | Refractive index | Abbe number |
|---|---|---|---|---|---|---|
| Object surface | Subject | Spherical surface | Infinity | Infinity | | |
| S1 | First lens | Spherical surface | −12.919273 | 1.289841 | 1.613 | 37.01 |
| S2 | | Spherical surface | 23.733724 | 1.026969 | | |
| S3 | Second lens | Spherical surface | 21.252473 | 3.599612 | 1.723 | 38.02 |
| S4 | | Spherical surface | −32.121515 | −0.345944 | | |
| ST | Stop | Spherical surface | Infinity | 1.690004 | | |
| S5 | Third lens | Aspheric surface | 12.506290 | 7.143667 | 1.497 | 81.56 |
| S6 | | Aspheric surface | −52.754684 | 0.628636 | | |
| S7 | Fourth lens | Spherical surface | 16.042089 | 5.677139 | 1.593 | 67.33 |
| S8 | Fifth lens | Spherical surface | −10.081255 | 0.715993 | 1.689 | 31.16 |
| S9 | | Spherical surface | 11.246756 | 0.422645 | | |
| S10 | Sixth lens | Spherical surface | 10.742125 | 3.769487 | 1.911 | 35.26 |
| S11 | | Spherical surface | 25.024764 | 1.226018 | | |
| S12 | Seventh lens | Aspheric surface | −132.998530 | 2.250446 | 1.621 | 63.88 |
| S13 | | Aspheric surface | 18.349997 | 0.500000 | | |
| S14 | Filter | Spherical surface | Infinity | 0.400000 | 1.517 | 64.20 |
| S15 | | Spherical surface | Infinity | 2.506232 | | |
| S16 | The imaging surface | Spherical surface | Infinity | — | | |

The parameters of the aspheric surfaces of the third lens L3 and the seventh lens L7 of this embodiment are shown in Table 4-2.

TABLE 4-2

| Surface NO. | K | B | C | D | E | F |
|---|---|---|---|---|---|---|
| S5 | −0.129101 | −2.872881E−05 | −2.329265E−07 | −1.880421E−09 | −6.484697E−12 | −9.658702E−13 |
| S6 | 19.643388 | 4.654210E−05 | −2.957472E−07 | 3.411484E−09 | −2.612202E−10 | 1.231211E−12 |
| S12 | 7.745911 | −1.174336E−03 | −6.115674E−06 | 1.103782E−06 | −5.287868E−08 | 1.145548E−09 |
| S13 | 5.080635 | −8.256122E−04 | −1.841075E−05 | 2.594343E−06 | −1.282417E−07 | 2.386339E−09 |

Figure 4B:
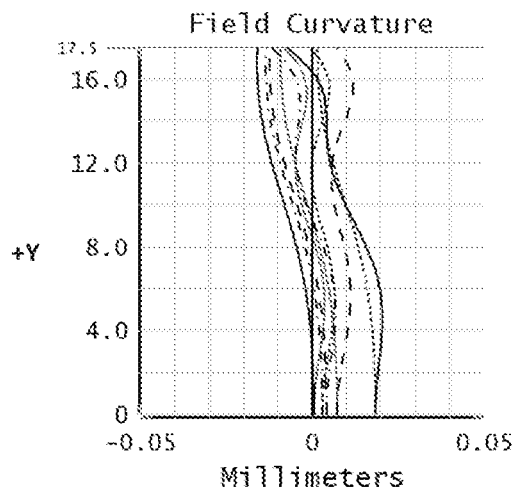
FIG. 4b is a field curvature diagram of the optical lens system according to the fourth embodiment of the present disclosure.
Figure 4C:
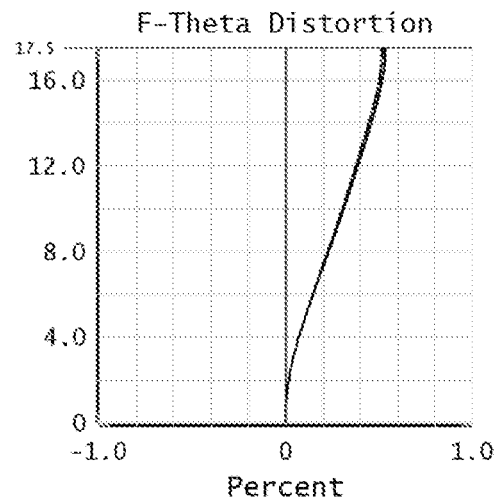
FIG. 4c is a distortion diagram of the optical lens system according to the fourth embodiment of the present disclosure.
Figure 4D:
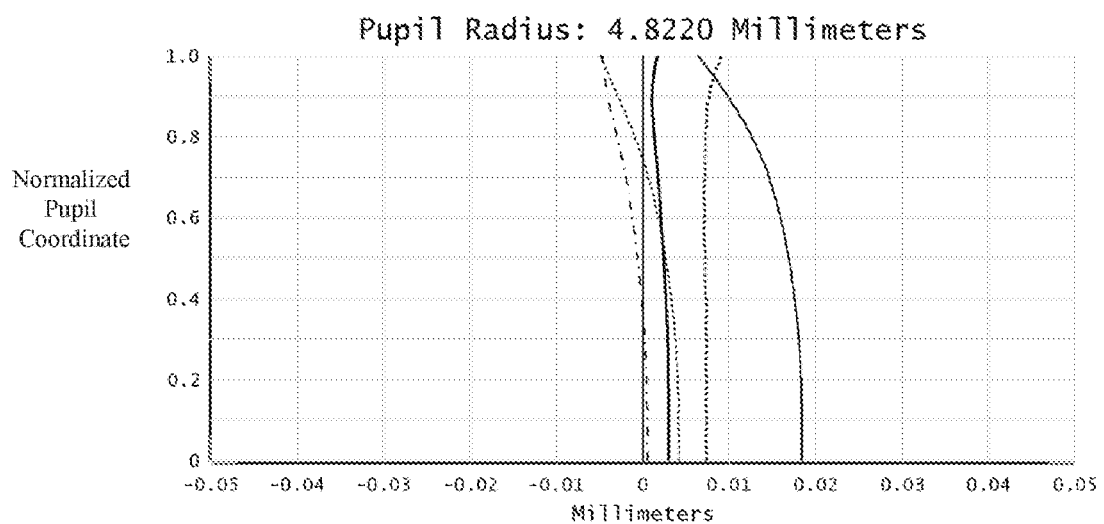
FIG. 4d is an axial chromatic aberration diagram of the optical lens system according to the fourth embodiment of the present disclosure.

FIG. 4b, FIG. 4c, and FIG. 4d illustrate the field curvature diagram, distortion diagram and axial chromatic aberration diagram of the optical lens system 10 in this embodiment, respectively. As can be seen from FIG. 4b to FIG. 4d, the field curvature, the distortion and the chromatic aberration can be well corrected in this embodiment.

Embodiment 5

Figure 5A:
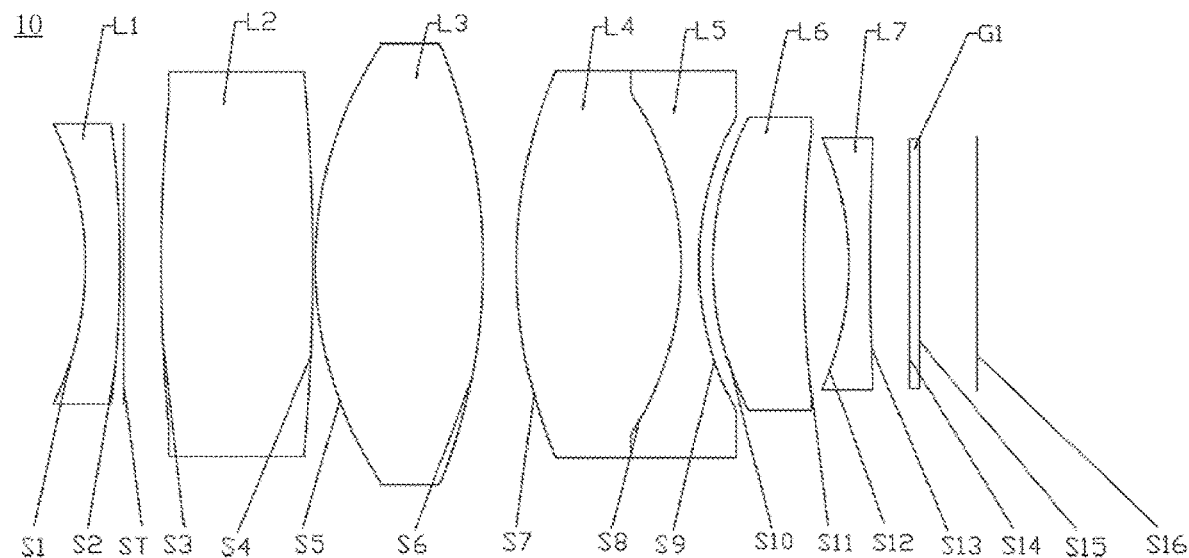
FIG. 5a is a schematic cross-sectional view of the optical lens system according to a fifth embodiment of the present disclosure.

Please refer to FIG. 5a, FIG. 5a is a structural diagram of an optical lens system 10 according to the fifth embodiment of the present disclosure. The lens structure provided in this embodiment is different from the lens structure in the first embodiment is that: (1) the second lens L2 is a glass spherical lens and the third lens L3 is a glass aspherical lens; (2) the related parameters of other lenses are different. Related parameters of each lens are shown in Table 5-1.

TABLE 5-1

| Surface NO. | Surface type | Radius of curvature | Thickness | Refractive index | Abbe number |
|---|---|---|---|---|---|
| Object surface | Subject | Spherical surface | Infinity | Infinity | | |
| S1 | First lens | Spherical surface | −11.768684 | 1.294693 | 1.613 | 37.01 |
| S2 | | Spherical surface | −37.145784 | 0.116731 | | |
| ST | Stop | Spherical surface | Infinity | 1.410072 | | |
| S3 | Second lens | Spherical surface | 71.865315 | 5.678253 | 1.702 | 41.14 |
| S4 | | Spherical surface | −71.865315 | 0.069331 | | |
| S5 | Third lens | Aspheric surface | 12.904154 | 6.238990 | 1.497 | 81.56 |
| S6 | | Aspheric surface | −21.680249 | 1.269446 | | |
| S7 | Fourth lens | Spherical surface | 18.280772 | 6.154973 | 1.593 | 67.33 |
| S8 | Fifth lens | Spherical surface | −11.781805 | 0.684010 | 1.689 | 31.16 |
| S9 | | Spherical surface | 11.781805 | 0.520732 | | |
| S10 | Sixth lens | Spherical surface | 11.864835 | 3.357487 | 1.911 | 35.26 |
| S11 | | Spherical surface | 38.183902 | 1.689353 | | |
| S12 | Seventh lens | Aspheric surface | −8.717423 | 0.792207 | 1.693 | 53.20 |
| S13 | | Aspheric surface | 36.697089 | 1.500000 | | |
| S14 | Filter | Spherical surface | Infinity | 0.400000 | 1.517 | 64.20 |
| S15 | | Spherical surface | Infinity | 1.236688 | | |
| S16 | The imaging surface | Spherical surface | Infinity | — | | |

The parameters of the aspheric surfaces of the third lens L3 and the seventh lens L7 of this embodiment are show in Table 5-2.

TABLE 5-2

| Surface NO. | K | B | C | D | E | F |
|---|---|---|---|---|---|---|
| S5 | −0.061775 | −3.830596E−05 | −2.344060E−07 | −2.866294E−09 | 3.296568E−11 | −1.876436E−12 |
| S6 | −3.550114 | 2.512564E−05 | −6.496719E−07 | 1.316625E−08 | −3.262862E−10 | 9.838649E−13 |
| S12 | −7.147404 | 8.951393E−04 | −1.176606E−04 | 6.271543E−06 | −2.267900E−07 | 3.924972E−09 |
| S13 | −30.074227 | 2.253746E−03 | −1.522784E−04 | 7.617005E−06 | −2.700699E−07 | 4.577218E−09 |

Figure 5B:
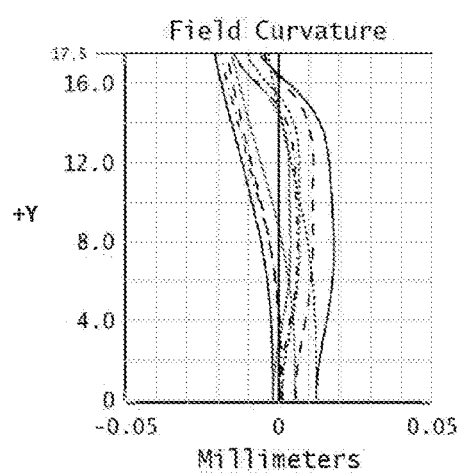
FIG. 5b is a field curvature diagram of the optical lens system according to the fifth embodiment of the present disclosure.
Figure 5C:
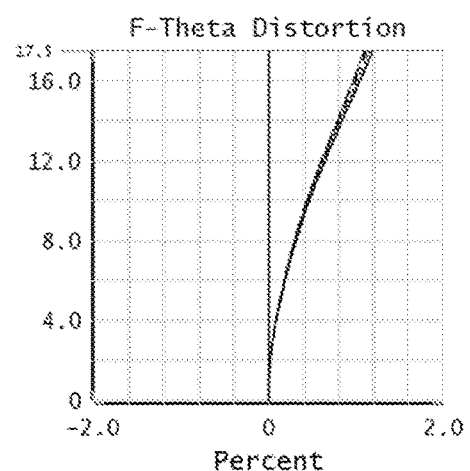
FIG. 5c is a distortion diagram of the optical lens system according to the fifth embodiment of the present disclosure.
Figure 5D:
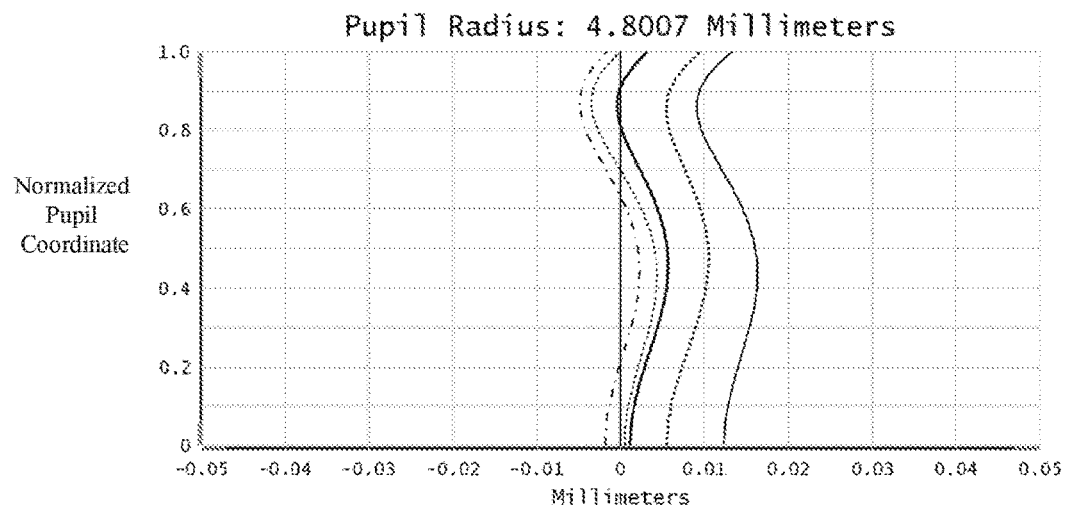
FIG. 5d is an axial chromatic aberration diagram of the optical lens system according to the fifth embodiment of the present disclosure.

FIG. 5b, FIG. 5c, and FIG. 5d illustrate the field curvature diagram, distortion diagram and axial chromatic aberration diagram of the optical lens system 10 in this embodiment, respectively. As can be seen from FIG. 5b to FIG. 5d, the field curvature, the distortion and the chromatic aberration can be well corrected in this embodiment.

Embodiment 6

Figure 6A:
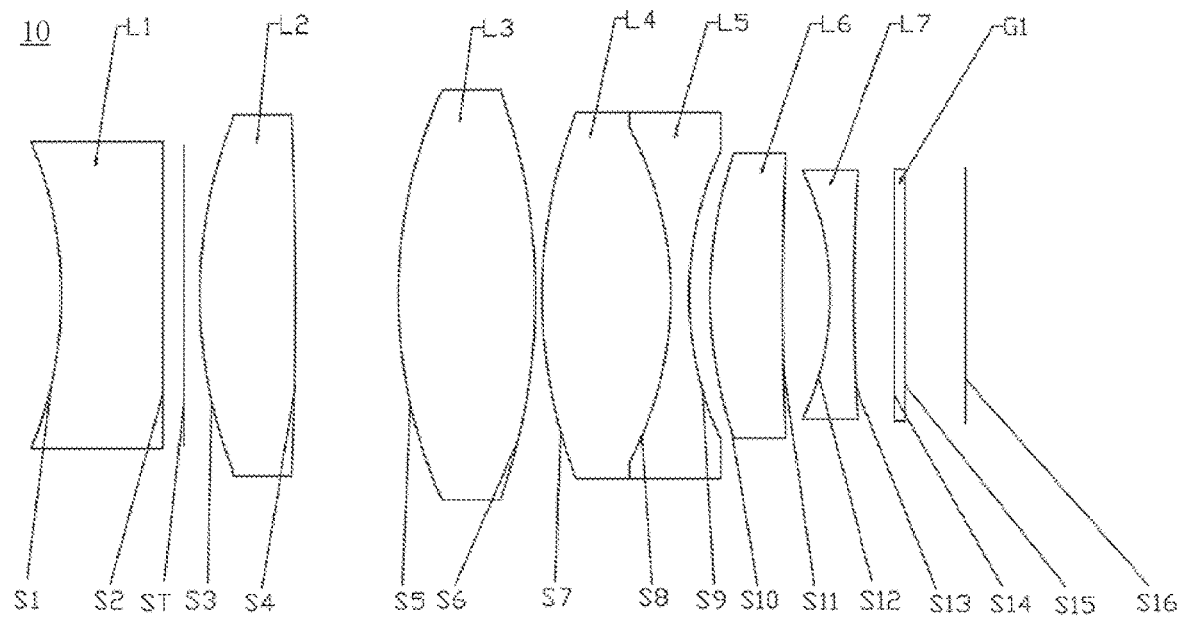
FIG. 6a is a schematic cross-sectional view of the optical lens system according to a sixth embodiment of the present disclosure.

Please refer to FIG. 6a, FIG. 6a is a structural diagram of an optical lens system 10 according to the sixth embodiment of the present disclosure. The lens structure provided in this embodiment is different from the lens structure in the first embodiment is that: (1) an object side surface and an image side surface of the first lens L1 both are concave surfaces; (2) the related parameters of other lenses are different. Related parameters of each lens are shown in Table 6-1.

TABLE 6-1

| Surface NO. | Surface type | Radius of curvature | Thickness | Refractive index | Abbe number |
|---|---|---|---|---|---|
| Object surface | Subject | Spherical surface | Infinity | Infinity | | |
| S1 | First lens | Spherical surface | −15.086739 | 3.764504 | 1.613 | 37.01 |
| S2 | | Spherical surface | 7511.960350 | 0.787493 | | |
| ST | Stop | Spherical surface | Infinity | 0.568907 | | |
| S3 | Second lens | Aspheric surface | 17.873900 | 3.581276 | 1.693 | 53.20 |
| S4 | | Aspheric surface | −66.254643 | 3.795931 | | |
| S5 | Third lens | Spherical surface | 18.922684 | 5.073042 | 1.497 | 81.59 |
| S6 | | Spherical surface | −22.380420 | 0.200884 | | |
| S7 | Fourth lens | Spherical surface | 18.637740 | 4.801748 | 1.593 | 67.33 |
| S8 | Fifth lens | Spherical surface | −13.216421 | 0.698164 | 1.689 | 31.16 |
| S9 | | Spherical surface | 13.192973 | 0.780003 | | |
| S10 | Sixth lens | Spherical surface | 17.076361 | 2.643280 | 1.911 | 35.26 |
| S11 | | Spherical surface | 102.025137 | 1.768678 | | |
| S12 | Seventh lens | Aspheric surface | −10.694324 | 0.882926 | 1.693 | 53.70 |
| S13 | | Aspheric surface | 148.880149 | 1.500000 | | |
| S14 | Filter | Spherical surface | Infinity | 0.400000 | 1.517 | 64.20 |
| S15 | | Spherical surface | Infinity | 1.427990 | | |
| S16 | The imaging surface | Spherical surface | Infinity | — | | |

The parameters of the aspheric surfaces of the second lens L2 and the seventh lens L7 of this embodiment are shown in Table 6-2.

TABLE 6-2

| Surface NO. | K | B | C | D | E | F |
|---|---|---|---|---|---|---|
| S3 | −1.024586 | −4.179503E−06 | 1.235109E−06 | −4.097853E−08 | 9.340466E−10 | −7.726421E−12 |
| S4 | −20.001137 | 4.736774E−05 | 1.384022E−06 | −4.010289E−08 | 8.986167E−10 | −6.938365E−12 |
| S12 | −0.887615 | 2.034939E−05 | 6.852168E−06 | −9.632577E−07 | 3.693775E−08 | 5.187990E−10 |
| S13 | −10.065135 | 1.915262E−04 | −2.803897E−06 | 5.087626E−08 | −8.218600E−09 | 2.166400E−10 |

Figure 6B:
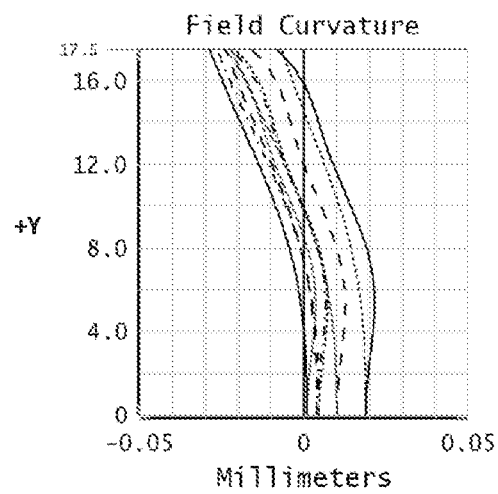
FIG. 6b is a field curvature diagram of the optical lens system according to the sixth embodiment of the present disclosure.
Figure 6C:
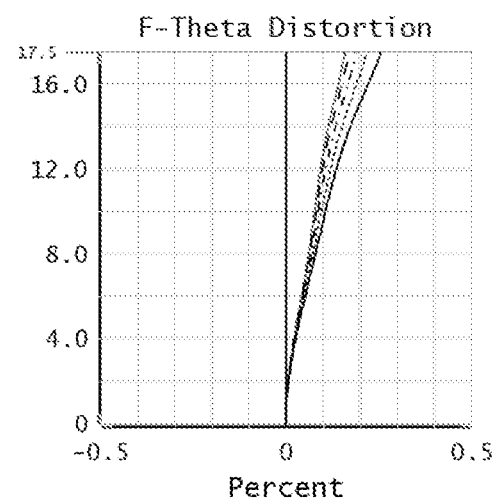
FIG. 6c is a distortion diagram of the optical lens system according to the sixth embodiment of the present disclosure.
Figure 6D:
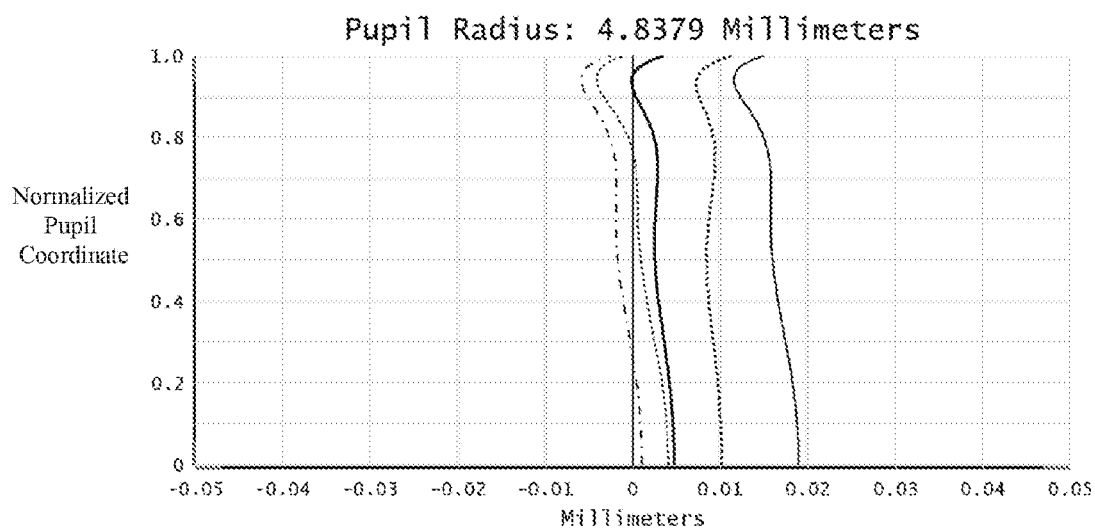
FIG. 6d is an axial chromatic aberration diagram of the optical lens system according to the sixth embodiment of the present disclosure.

FIG. 6b, FIG. 6c, and FIG. 6d illustrate the field curvature diagram, distortion diagram and axial chromatic aberration diagram of the optical lens system 10 in this embodiment, respectively. As can be seen from FIG. 6b to FIG. 6d, the field curvature, the distortion and the chromatic aberration can be well corrected in this embodiment.

Embodiment 7

Figure 7A:
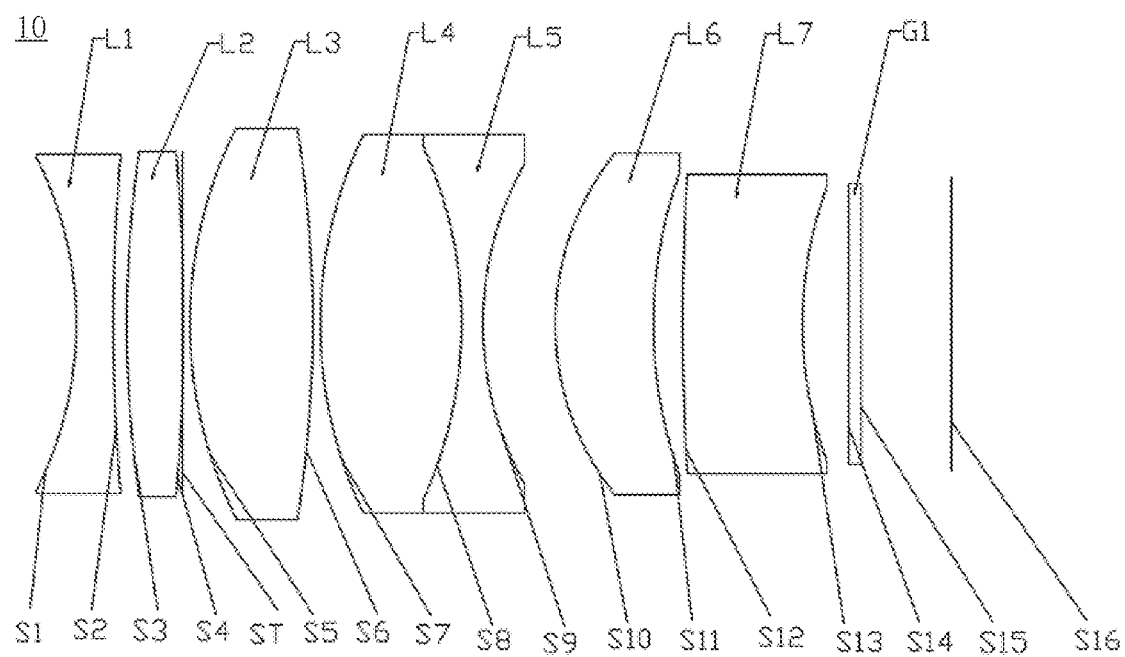
FIG. 7a is a schematic cross-sectional view of the optical lens system according to a seventh embodiment of the present disclosure.

Please refer to FIG. 7a, FIG. 7a is a structural diagram of an optical lens system 10 according to the seventh embodiment of the present disclosure. The lens structure provided in this embodiment is different from the lens structure in the first embodiment is that: (1) the object side surface and image side surface of the first lens L1 both are concave surfaces and an object side surface of the seventh lens L7 is a convex surface and an image side surface of the seventh lens L7 is a concave surface; (2) the stop ST is disposed between the second lens L2 and the third lens L3; (3) the second lens L2 is a glass spherical lens; (4) the related parameters of other lenses are different. Related parameters of each lens are shown in Table 7-1.

TABLE 7-1

| Surface NO. | Surface type | Radius of curvature | Thickness | Refractive index | Abbe number |
|---|---|---|---|---|---|
| Object surface | Subject | Spherical surface | Infinity | Infinity | | |
| S1 | First lens | Spherical surface | −11.869604 | 1.184962 | 1.689 | 31.16 |
| S2 | | Spherical surface | 56.436099 | 0.465043 | | |
| S3 | Second lens | Spherical surface | 40.362307 | 1.799362 | 1.923 | 20.88 |
| S4 | | Spherical surface | −67.992181 | −0.031767 | | |
| ST | Stop | Spherical surface | Infinity | 0.231758 | | |
| S5 | Third lens | Spherical surface | 13.935701 | 4.004251 | 1.678 | 55.56 |
| S6 | | Spherical surface | −36.567965 | 0.199991 | | |
| S7 | Fourth lens | Spherical surface | 14.176259 | 4.595935 | 1.593 | 67.33 |
| S8 | Fifth lens | Spherical surface | −13.594701 | 0.699995 | 1.741 | 27.76 |
| S9 | | Spherical surface | 10.740992 | 2.295061 | | |
| S10 | Sixth lens | Spherical surface | 8.816665 | 3.190814 | 1.901 | 37.05 |
| S11 | | Spherical surface | 14.360952 | 0.919291 | | |
| S12 | Seventh lens | Aspheric surface | 17.133016 | 3.891408 | 1.693 | 53.20 |
| S13 | | Aspheric surface | 11.144885 | 1.500000 | | |
| S14 | Filter | Spherical surface | Infinity | 0.400000 | 1.517 | 64.20 |

TABLE 7-1-continued

| Surface NO. | Surface type | Radius of curvature | Thickness | Refractive index | Abbe number |
|---|---|---|---|---|---|
| S15 | Spherical surface | Infinity | 2.508511 | | |
| S16 | The imaging surface Spherical surface | Infinity | — | | |

The parameters of the aspheric surfaces of the seventh lens L7 of this embodiment are shown in Table 7-2.

TABLE 7-2

| Surface NO. | K | B | C | D | E | F |
|---|---|---|---|---|---|---|
| S12 | 7.379160 | −1.027395E−03 | −1.532344E−05 | 2.720411E−07 | −3.319238E−09 | 0.000000E+00 |
| S13 | 3.470672 | −6.495477E−04 | −2.818808E−05 | 1.283836E−06 | −3.869590E−08 | 0.000000E+00 |

Figure 7B:
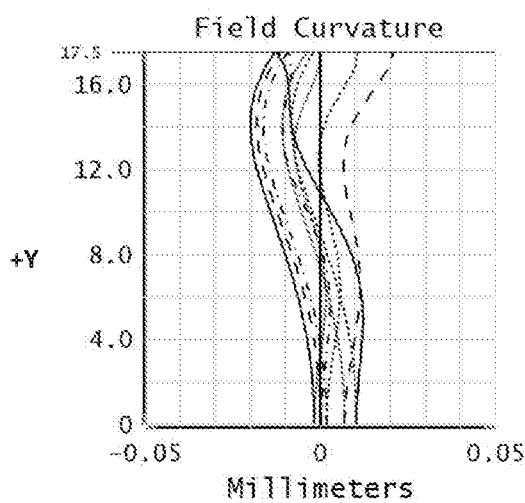
FIG. 7b is a field curvature diagram of the optical lens system according to the seventh embodiment of the present disclosure.
Figure 7C:
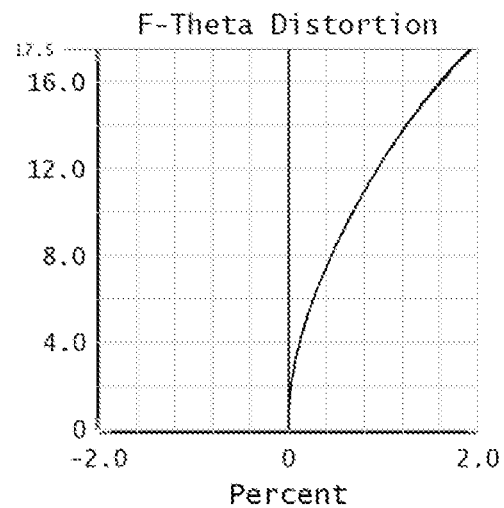
FIG. 7c is a distortion diagram of the optical lens system according to the seventh embodiment of the present disclosure.
Figure 7D:
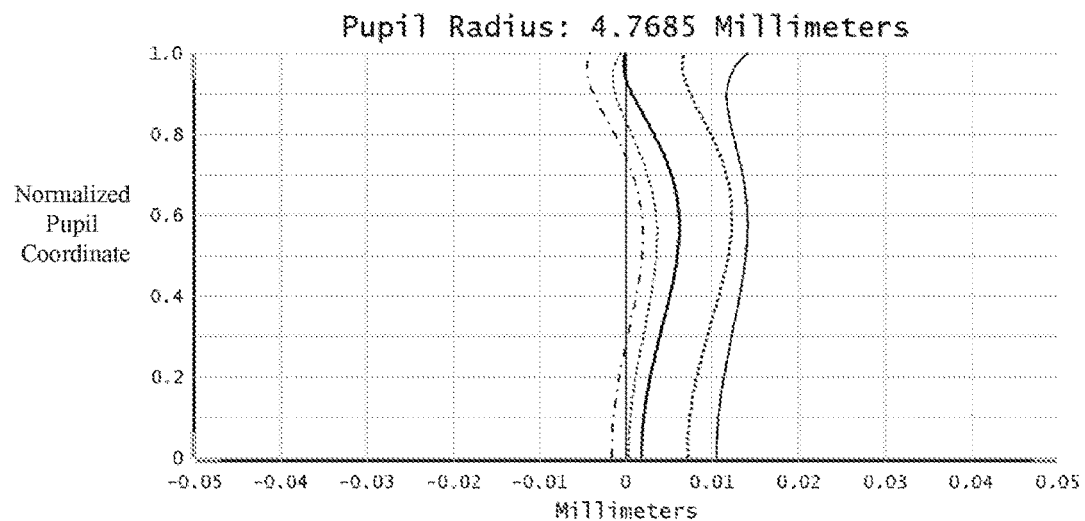
FIG. 7d is an axial chromatic aberration diagram of the optical lens system according to the seventh embodiment of the present disclosure.

FIG. 7b, FIG. 7c, and FIG. 7d illustrate the field curvature diagram, distortion diagram and axial chromatic aberration diagram of the optical lens system 10 in this embodiment, respectively. As can be seen from FIG. 7b to FIG. 7d, the field curvature, the distortion and the chromatic aberration can be well corrected in this embodiment.

Embodiment 8

Figure 8A:
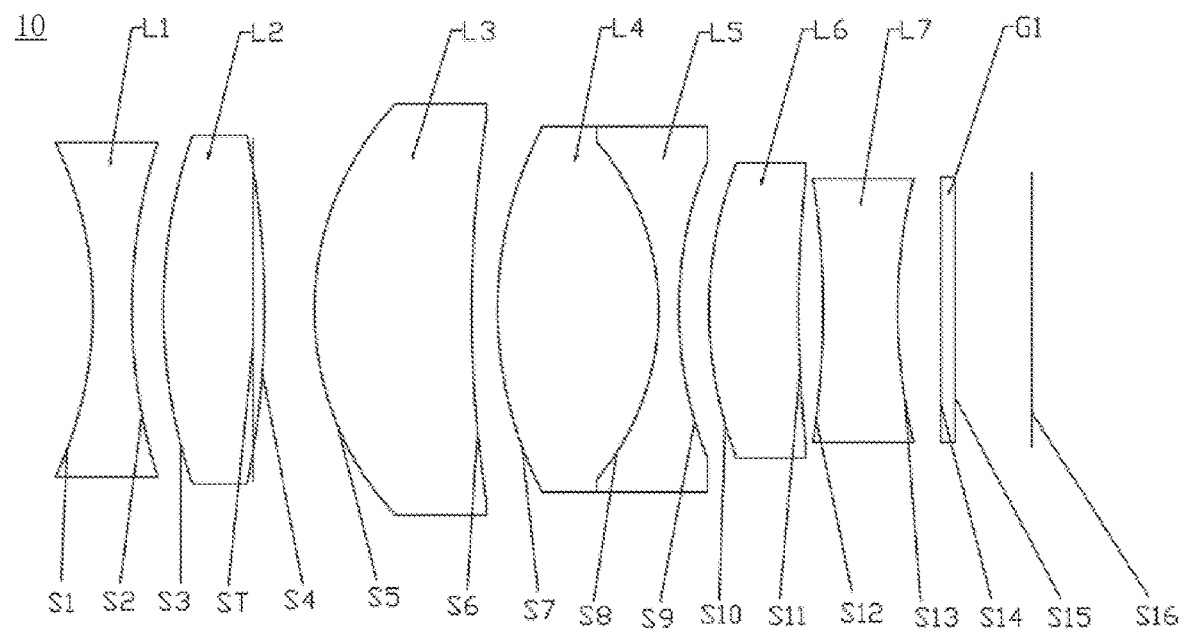
FIG. 8a is a schematic cross-sectional view of the optical lens system according to an eighth embodiment of the present disclosure.

Please refer to FIG. 8a, FIG. 8a is a structural diagram of an optical lens system 10 according to the eighth embodiment of the present disclosure. The lens structure provided in this embodiment is different from the lens structure in the first embodiment is that: (1) the object side surface and image side surface of the first lens L1 both are concave surfaces and an object side surface of the third lens L3 is a convex surface and an image side surface of the third lens L3 is a concave surface and an object side surface of the seventh lens L7 is a convex surface and an image side surface of the seventh lens L7 is a concave surface; (2) the stop ST is disposed between the second lens L2 and the third lens L3; (3) the second lens L2 is a glass spherical lens and the third lens L3 is a glass aspherical lens; (4) the related parameters of other lenses are different. Related parameters of each lens are shown in Table 8-1.

TABLE 8-1

| Surface NO. | | Surface type | Radius of curvature | Thickness | Refractive index | Abbe number |
|---|---|---|---|---|---|---|
| | Subject | Spherical surface | Infinity | Infinity | | |
| S1 | First lens | Spherical surface | −13.728598 | 1.348103 | 1.613 | 37.01 |
| S2 | | Spherical surface | 19.460816 | 1.115384 | | |
| S3 | Second lens | Spherical surface | 19.434470 | 3.453031 | 1.723 | 38.02 |
| S4 | | Spherical surface | −31.003429 | −0.390284 | | |
| ST | Stop | Spherical surface | Infinity | 2.149615 | | |
| S5 | Thirds | Aspheric surface | 10.793669 | 5.466395 | 1.497 | 81.59 |
| S6 | | Aspheric surface | 113.187699 | 0.880028 | | |
| S7 | Fourth lens | Spherical surface | 13.996411 | 5.585765 | 1.593 | 67.33 |
| S8 | Fifth lens | Spherical surface | −9.196558 | 0.699455 | 1.689 | 31.16 |
| S9 | | Spherical surface | 13.686747 | 1.027338 | | |
| S10 | Sixth lens | Spherical surface | 13.866547 | 3.119939 | 1.911 | 35.26 |
| S11 | | Spherical surface | 43.336727 | 0.830557 | | |
| S12 | Seventh lens | Aspheric surface | 53.858264 | 2.592158 | 1.621 | 63.88 |
| S13 | | Aspheric surface | 11.742482 | 1.500000 | | |
| S14 | Filter | Spherical surface | Infinity | 0.400000 | 1.517 | 64.20 |
| S15 | | Spherical surface | Infinity | 2.263113 | | |
| S16 | The imaging surface | Spherical surface | Infinity | — | | |

The parameters of the aspheric surfaces of the third lens L3 and the seventh lens L7 of this embodiment are shown in Table 8-2.

TABLE 8-2

| Surface NO. | K | B | C | D | E | F |
|---|---|---|---|---|---|---|
| S5 | −0.038258 | −1.585391E−06 | 9.106299E−07 | −1.604129E−08 | 2.777369E−10 | −6.838692E−13 |
| S6 | 226.067288 | 5.993153E−05 | 2.791742E−06 | −9.818705E−08 | 2.300783E−09 | −1.980628E−11 |

TABLE 8-2-continued

| Surface NO. | K | B | C | D | E | F |
|---|---|---|---|---|---|---|
| S12 | 43.893821 | −1.107150E−03 | −1.971119E−05 | 1.654027E−06 | −7.941819E−08 | 1.386705E−09 |
| S13 | 1.207905 | −7.848638E−04 | −3.034763E−05 | 2.708641E−06 | −1.185474E−07 | 1.968214E−09 |

Figure 8B:
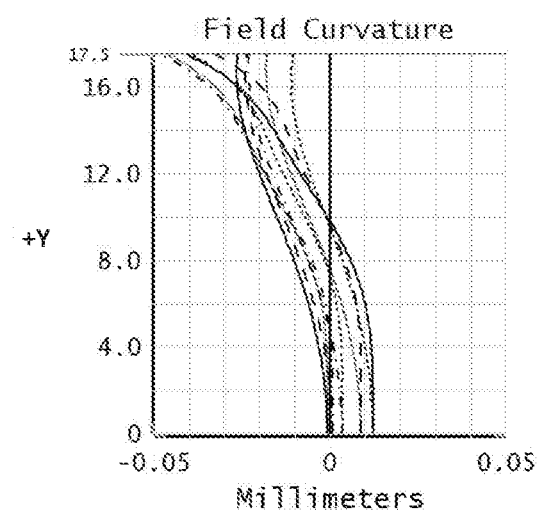
FIG. 8b is a field curvature diagram of the optical lens system according to the eighth embodiment of the present disclosure.
Figure 8C:
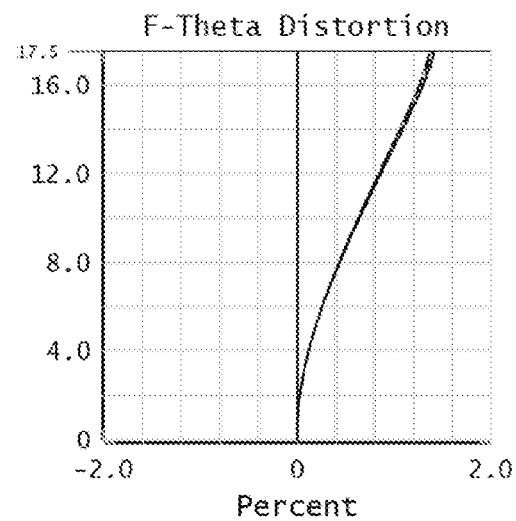
FIG. 8c is a distortion diagram of the optical lens system according to the eighth embodiment of the present disclosure.
Figure 8D:
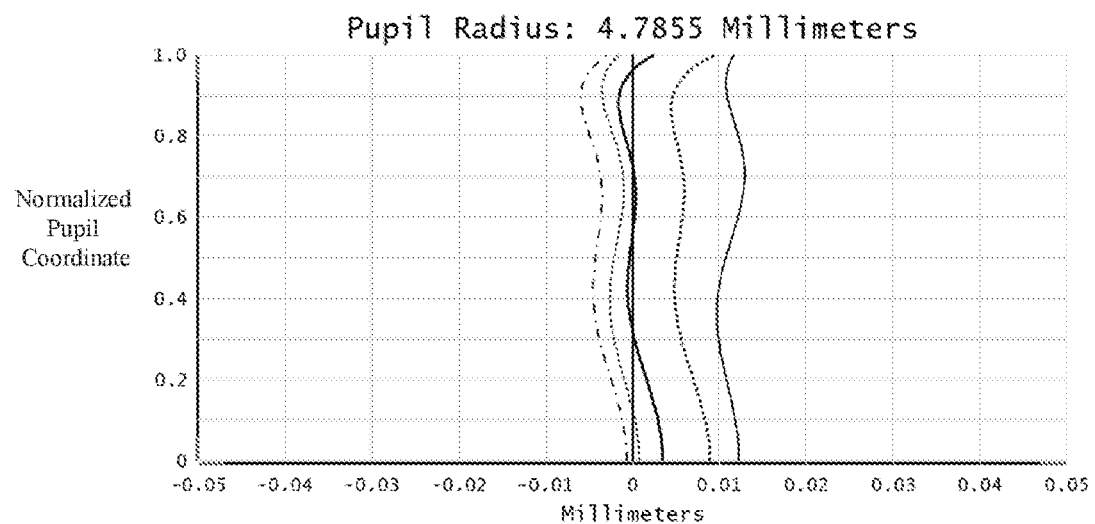
FIG. 8d is an axial chromatic aberration diagram of the optical lens system according to the eighth embodiment of the present disclosure.

FIG. 8b, FIG. 8c, and FIG. 8d illustrate the field curvature diagram, distortion diagram and axial chromatic aberration diagram of the optical lens system 10 in this embodiment, respectively. As can be seen from FIG. 8b to FIG. 8d, the field curvature, the distortion and the chromatic aberration can be well corrected in this embodiment.

Table 9 shows the above eight embodiments and their corresponding optical characteristics. Table 9 includes the system focal length f, the aperture number F # and the system optical total length TTL, and values corresponding to each of the preceding conditional expressions.

TABLE 9

| Condition | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| f (mm) | 15.488 | 15.406 | 15.430 | 15.430 | 15.362 | 15.481 | 15.259 | 15.314 |
| F# | 1.600 | 1.600 | 1.600 | 1.600 | 1.600 | 1.600 | 1.600 | 1.600 |
| TTL (mm) | 33.5 | 33.4 | 33.2 | 33.5 | 33.3 | 33.5 | 28.3 | 32.5 |
| $\varphi_3 + \varphi_4$ | 60.287 | 70.617 | 69.151 | 55.924 | 56.798 | 61.073 | 46.333 | 53.408 |
| $(dn/dt)_3 + (dn/dt)_4$ | $-8.1 \times 10^{-6}$ | $-8.3 \times 10^{-6}$ | $-8.8 \times 10^{-6}$ | $-7.5 \times 10^{-6}$ | $-8.1 \times 10^{-6}$ | $-9.0 \times 10^{-6}$ | $-2.1 \times 10^{-6}$ | $-7.5 \times 10^{-6}$ |
| $Vd_3 + Vd_4$ | 180.082 | 193.588 | 193.588 | 180.047 | 180.047 | 180.096 | 150.648 | 180.047 |
| $\Delta Pg, F3 + \Delta Pg, F4$ | 0.040 | 0.068 | 0.068 | 0.048 | 0.048 | 0.049 | 0.009 | 0.048 |
| $\|\|f_{52}\|-t_{52}\|$ | 7.331 | 9.239 | 12.455 | 4.202 | 6.617 | 8.836 | 0.690 | 7.531 |
| $\|\|f_{61}\|-t_{61}\|$ | 3.782 | 7.570 | 9.863 | 0.124 | 3.091 | 9.227 | 3.064 | 3.948 |
| IH/θ | 0.270 | 0.269 | 0.271 | 0.270 | 0.269 | 0.270 | 0.271 | 0.271 |
| $f_1/r_1$ | 2.148 | 1.009 | 0.970 | 1.038 | 2.425 | 1.621 | 1.185 | 0.938 |
| $CT_2 + CT_3$ | 11.176 | 7.767 | 7.984 | 10.743 | 11.917 | 8.654 | 5.804 | 8.919 |
| $f_3/r_5$ | 1.073 | 3.389 | 3.490 | 1.684 | 1.339 | 1.134 | 1.100 | 2.181 |
| $f_7/r_{13}$ | −0.296 | −12.619 | −6.209 | −1.404 | −0.453 | −0.096 | −5.608 | −2.104 |

In the above embodiments, the optical system lens provided by the present disclosure can achieve the following optical index: (1) optical total length: TTL<33.5 mm, (2) applicable spectral range: 400 nm~700 nm.

Figure 9:
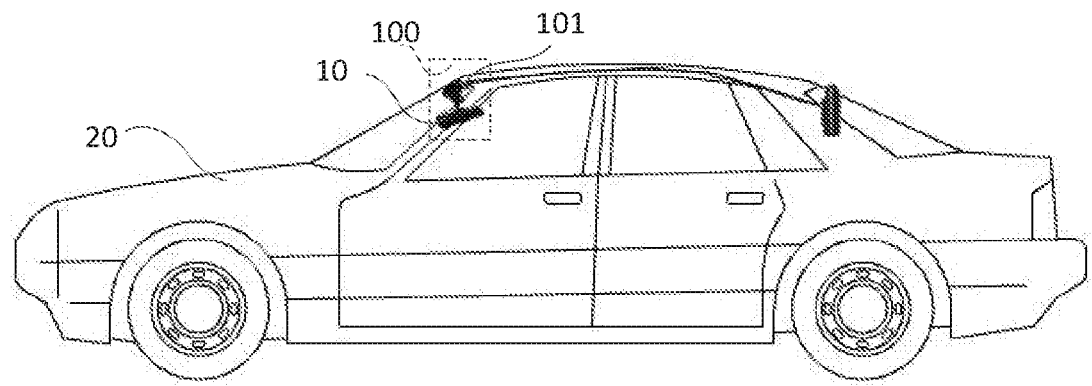
FIG. 9 is a schematic view of a vehicle camera according to an embodiment of the present disclosure.

As illustrated in FIG. 9, the present disclosure provides a vehicle camera 100 mounted in a vehicle 20. The vehicle camera 100 includes an image sensor 101 and the optical lens system 10 of any embodiment as described above. The image sensor 101 is used to convert an optical image formed by the optical lens system 10 into electric signals, so that a driverless vehicle system of the vehicle 20 can control the direction or the speed of the vehicle 20 according to the electric signals to implement the functions of driverless driving.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. An optical lens system, from an object side to an imaging surface thereof, the optical lens system sequentially comprising:
   a first lens having a negative refractive power and a concave surface facing the object side;
   a second lens having a positive refractive power and two convex surfaces;
   a third lens having a positive refractive power and a convex surface facing the object side;
   a fourth lens having a positive refractive power and two convex surfaces;
   a fifth lens having a negative refractive power and two concave surfaces, the fourth lens and the fifth lens constituting a cemented lens;
   a sixth lens having a positive refractive power, a convex surface facing the object side and a concave surface facing the imaging surface;
   a seventh lens having a negative refractive power and a concave surface facing the imaging surface;
   wherein the optical lens system further comprises a stop disposed between the first lens and the third lens, the first lens, the fourth lens and the fifth lens are glass spherical lenses, and the seventh lens is a glass aspheric lens.

2. The optical lens system as claimed in claim 1, wherein the third lens and the fourth lens satisfy the following expression:

$$(dn/dt)_3 + (dn/dt)_4 < -2 \times 10^{6}/^\circ C.;$$

where $(dn/dt)_3$ represents a temperature coefficient of refractive index of the third lens, $(dn/dt)_4$ represents a temperature coefficient of refractive index of the fourth lens.

3. The optical lens system as claimed in claim 1, wherein the third lens and the fourth lens satisfy the following expressions:

$$Vd_3 + Vd_4 > 150;$$

$$\Delta Pg, F3 + \Delta Pg, F4 > 0.005;$$

where $Vd_3$ represents the abbe number of the third lens, $Vd_4$ represents the abbe number of the fourth lens, $\Delta Pg, F3$ represents a deviation of relative partial dispersion from the abbe empirical formula of the third lens, ΔPg,F4 represents a deviation of relative partial dispersion from the abbe empirical formula of the fourth lens.

4. The optical lens system as claimed in claim 1, wherein the optical lens system satisfies the following expressions:

$$0.5<||f_{52}|-t_{52}|<13;$$

$$0.1<||f_{61}|-t_{61}|<10;$$

where $f_{52}$ represents a focal length of an image side surface of the fifth lens, $f_{61}$ represents a focal length of an object side surface of the sixth lens, $t_{52}$ represents a distance from a vertex of an image side surface of the fifth lens to the imaging surface of the optical lens system, $t_{61}$ is a distance from a vertex of an object side surface of the sixth lens to the imaging surface of the optical lens system.

5. The optical lens system as claimed in claim 1, wherein the optical lens system satisfies the following expression:

$$0.2<IH/\theta<0.3;$$

where θ represents half field angle of the optical lens system, and IH represents an image height when the half field angle is θ.

6. The optical lens system as claimed in claim 1, wherein the third lens and the fourth lens satisfy the following expression:

$$40<\varphi_3+\varphi_4<75;$$

where $\varphi_3$ represents a refractive power of the third lens, $\varphi_4$ represents a refractive power of the fourth lens.

7. The optical lens system as claimed in claim 1, wherein the optical lens system satisfies the following expression:

$$0.5<f_1/r_1<3;$$

where $f_1$ represents a focal length of the first lens, $r_1$ represents a radius of curvature of an object side surface of the first lens.

8. The optical lens system as claimed in claim 1, wherein the optical lens system satisfies the following expression:

$$5<CT_2+CT_3<13;$$

where $CT_2$ represents a center thickness of the second lens, and $CT_3$ represents a center thickness of the third lens.

9. The optical lens system as claimed in claim 1, wherein the optical lens system satisfies the following expression:

$$1<f_3/r_5<4;$$

where $f_3$ represents a focal length of the third lens, $r_5$ represents a radius of curvature of an object side surface of the third lens.

10. The optical lens system as claimed in claim 1, wherein the optical lens system satisfies the following expression:

$$-13<f_7/r_{13}<0;$$

where $f_7$ represents a focal length of the seventh lens, and $r_{13}$ represents a radius of the curvature of an image side surface of the seventh lens.

11. A vehicle camera, comprising an image sensor and an optical lens system, the image sensor being configured to convert optical images formed by the optical lens system into electrical signals; from an object side to an imaging surface, the optical lens system sequentially comprising:
a first lens with a negative refractive power, comprising a concave surface facing the object side;
a second lens with a positive refractive power, comprising two convex surfaces respectively facing the object side and the imaging surface;
a third lens with a positive refractive power, comprising a convex surface facing the object side;
an achromatic doublet lens comprising a fourth lens with a positive refractive power and a fifth lens with a negative refractive power, an image side surface of the fourth lens being matched with and bonded to an object side surface of the fifth lens;
a sixth lens with a positive refractive power, comprising a convex surface facing the object side and a concave surface facing the imaging surface;
a seventh lens with a negative refractive power, comprising a concave surface facing the imaging surface;
wherein the optical lens system further comprises a stop disposed between the first lens and the third lens; the first lens, the fourth lens and the fifth lens are glass spherical lenses, and the seventh lens is a glass aspheric lens.

12. The vehicle camera as claimed in claim 11, wherein the third lens and the fourth lens satisfy the following expression:

$$(dn/dt)_3+(dn/dt)_4<-2\times10^{-6}/^\circ\text{ C.};$$

where $(dn/dt)_3$ represents a temperature coefficient of refractive index of the third lens, $(dn/dt)_4$ represents a temperature coefficient of refractive index of the fourth lens.

13. The vehicle camera as claimed in claim 11, wherein the third lens and the fourth lens satisfy the following expressions:

$$Vd_3+Vd_4>150;$$

$$\Delta Pg,F3+\Delta Pg,F4>0.005;$$

where $Vd_3$ represents the abbe number of the third lens, $Vd_4$ represents the abbe number of the fourth lens, ΔPg,F3 represents a deviation of relative partial dispersion from the abbe empirical formula of the third lens, ΔPg,F4 represents a deviation of relative partial dispersion from the abbe empirical formula of the fourth lens.

14. The vehicle camera as claimed in claim 11, wherein the optical lens system satisfies the following expressions:

$$0.5<||f_{52}|-t_{52}|<13;$$

$$0.1<||f_{61}|-t_{61}|<10;$$

where $f_{52}$ represents a focal length of an image side surface of the fifth lens, $f_{61}$ represents a focal length of an object side surface of the sixth lens, $t_{52}$ represents a distance from a vertex of an image side surface of the fifth lens to the imaging surface of the optical lens system, $t_{61}$ is a distance from a vertex of an object side surface of the sixth lens to the imaging surface of the optical lens system.

15. The vehicle camera as claimed in claim 11, wherein the optical lens system satisfies the following expression:

$$0.2<IH/\theta<0.3;$$

where θ represents half field angle of the optical lens system, and IH represents an image height when the half field angle is θ.

16. The vehicle camera as claimed in claim 11, wherein the third lens and the fourth lens satisfy the following expression:

$$40<\varphi_3+\varphi_4<75;$$

where $\varphi_3$ represents a refractive power of the third lens, $\varphi_4$ represents a refractive power of the fourth lens.

17. The vehicle camera as claimed in claim 11, wherein the optical lens system satisfies the following expression:

$$0.5<f_1/r_1<3;$$

$$1<f_3/r_5<4;$$

$$-13<f_7/r_{13}<0;$$

$$5<CT_2+CT_3<13;$$

where $f_1$ represents a focal length of the first lens, $r_1$ represents a radius of curvature of an object side surface of the first lens; $f_3$ represents a focal length of the third lens, $r_5$ represents a radius of curvature of an object side surface of the third lens; $f_7$ represents a focal length of the seventh lens, and $r_{13}$ represents a radius of the curvature of an image side surface of the seventh lens; $CT_2$ represents a center thickness of the second lens, and $CT_3$ represents a center thickness of the third lens.

18. An optical lens system, from an object side to an imaging surface thereof, sequentially comprising:
a first lens with a negative refractive power, an object side surface of the first lens being concave;
a second lens with a positive refractive power, an object side surface and an image side surface of the second lens each being convex;
a third lens with a positive refractive power, an object side surface of the third lens being convex;
an achromatic doublet lens, comprising a fourth lens with a positive refractive power and a fifth lens with a negative refractive power, an object side surface and an image side surface of the fourth lens each being convex, an object side surface and an image side surface of the fifth lens each being concave;
a sixth lens with a positive refractive power, an object side surface of the sixth lens being convex and an image side surface of the sixth lens being concave;
a seventh lens with a negative refractive power, an image side surface of the seventh lens being concave;
wherein the optical lens system further comprises a stop disposed between the first lens and the third lens; the first lens, the fourth lens and the fifth lens are glass spherical lenses, and the seventh lens is a glass aspheric lens;
wherein the optical lens system satisfies the expression:
$0.2<IH/\theta<0.3$, where $\theta$ represents half field angle of the optical lens system, and IH represents an image height when the half field angle is $\theta$.

19. The optical lens system as claimed in claim 18, wherein the third lens and the fourth lens satisfy the following expressions:

$$(dn/dt)_3+(dn/dt)_4<-2\times10^{-6}/°\text{ C.};$$

$$Vd_3+Vd_4>150;$$

$$\Delta Pg,F3+\Delta Pg,F4>0.005;$$

$$40<\varphi_3+\varphi_4<75;$$

where $(dn/dt)_3$ represents a temperature coefficient of refractive index of the third lens, $(dn/dt)_4$ represents a temperature coefficient of refractive index of the fourth lens; $Vd_3$ represents the abbe number of the third lens, $Vd_4$ represents the abbe number of the fourth lens, $\Delta Pg,F3$ represents a deviation of relative partial dispersion from the abbe empirical formula of the third lens, $\Delta Pg,F4$ represents a deviation of relative partial dispersion from the abbe empirical formula of the fourth lens; $\varphi_3$ represents a refractive power of the third lens, $\varphi_4$ represents a refractive power of the fourth lens.

20. The optical lens system as claimed in claim 19, wherein the optical lens system satisfies the following expressions:

$$0.5<||f_{52}|-t_{52}|<13;$$

$$0.1<||f_{61}|-t_{61}|<10;$$

$$0.5<f_1/r_1<3;$$

$$5<CT_2+CT_3<13;$$

$$1<f_3/r_5<4;$$

$$-13<f_7/r_{13}<0;$$

where $f_{52}$ represents a focal length of an image side surface of the fifth lens, $f_{61}$ represents a focal length of an object side surface of the sixth lens, $t_{52}$ represents a distance from a vertex of an image side surface of the fifth lens to the imaging surface of the optical lens system, $f_{61}$ is a distance from a vertex of an object side surface of the sixth lens to the imaging surface of the optical lens system; $f_1$ represents a focal length of the first lens, $r_1$ represents a radius of curvature of an object side surface of the first lens; $CT_2$ represents a center thickness of the second lens, and $CT_3$ represents a center thickness of the third lens; $f_3$ represents a focal length of the third lens, $r_5$ represents a radius of curvature of an object side surface of the third lens; $f_7$ represents a focal length of the seventh lens, and $r_{13}$ represents a radius of the curvature of an image side surface of the seventh lens.

\* \* \* \* \*